(12) United States Patent
Xin

(10) Patent No.: US 11,196,792 B2
(45) Date of Patent: Dec. 7, 2021

(54) METHOD, DEVICE AND SYSTEM FOR TRANSMITTING DATA

(71) Applicant: HANGZHOU HIKVISION DIGITAL TECHNOLOGY CO., LTD., Zhejiang (CN)

(72) Inventor: Anmin Xin, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/639,533

(22) PCT Filed: Aug. 14, 2018

(86) PCT No.: PCT/CN2018/100506
§ 371 (c)(1),
(2) Date: Feb. 14, 2020

(87) PCT Pub. No.: WO2019/034061
PCT Pub. Date: Feb. 21, 2019

(65) Prior Publication Data
US 2021/0176293 A1   Jun. 10, 2021

(30) Foreign Application Priority Data

Aug. 14, 2017 (CN) .......................... 201710691394.3

(51) Int. Cl.
*H04L 1/16* (2006.01)
*H04L 1/18* (2006.01)
*H04L 29/06* (2006.01)

(52) U.S. Cl.
CPC .......... *H04L 65/608* (2013.01); *H04L 1/1607* (2013.01); *H04L 1/1816* (2013.01); *H04L 65/1003* (2013.01); *H04L 65/607* (2013.01)

(58) Field of Classification Search
CPC ..... H04L 1/00; H04L 1/12; H04L 1/16; H04L 1/1607; H04L 1/18; H04L 1/1812;
(Continued)

(56) References Cited

U.S. PATENT DOCUMENTS 7,991,750 B1 *   8/2011  Xavier ................. H04L 1/1809
                                                        707/690
2006/0291468 A1 * 12/2006  Bopardikar ............ H04L 65/80
                                                        370/392
(Continued)

FOREIGN PATENT DOCUMENTS

CN          1451217 A       10/2003
CN          1454415 A       11/2003
(Continued)

OTHER PUBLICATIONS

Hussain, Efficient Data Hiding Techniques with Enhanced Capacity, SZABIST (Year: 2011).*
(Continued)

*Primary Examiner* — Boris D Grijalva Lobos
(74) *Attorney, Agent, or Firm* — Knobbe Martens Olson & Bear LLP

(57) ABSTRACT

A method of transmitting data, composing: transmitting a plurality of first Real-time Transport Protocol (RTP) data packets to a receiving end over an RTP data link established with the receiving end; receiving a retransmission indication message sent by the receiving end, the retransmission indication message being intended to indicate an RTP data packet to be retransmitted among the plurality of first RTP data packets; encapsulating the RTP data packet to be retransmitted according to the retransmission indication message to obtain a second RTP data packet, wherein the second RTP data packet composes an RTP padding field intended to indicate that the second RTP data packet is a retransmitted RTP data packet, and a type flag of the second
(Continued)

RTP data packet is same as a type flag of the first RTP data packet and transmitting the second RTP data packet to the receiving end over the RTP data link.

18 Claims, 11 Drawing Sheets

(58) Field of Classification Search
CPC ....... H04L 1/1816; H04L 65/00; H04L 65/10; H04L 65/1003; H04L 65/60; H04L 65/607; H04L 65/608
See application file for complete search history.

(56) References Cited

U.S. PATENT DOCUMENTS

| | | | |
|---|---|---|---|
| 2007/0133579 A1* | 6/2007 | Kim | H04W 28/06 370/403 |
| 2008/0009134 A1 | 1/2008 | Hung et al. | |
| 2010/0232437 A1* | 9/2010 | Bajpai | H04L 1/1896 370/400 |
| 2013/0021897 A1* | 1/2013 | Wu | H04L 1/1893 370/216 |
| 2014/0337473 A1* | 11/2014 | Frusina | H04N 21/6131 709/217 |

FOREIGN PATENT DOCUMENTS

| | | | | |
|---|---|---|---|---|
| CN | 1567915 A | | 1/2005 | |
| CN | 101262321 A | | 9/2008 | |
| CN | 101552660 A | | 10/2009 | |
| CN | 102546081 A | | 7/2012 | |
| CN | 102595251 A | | 7/2012 | |
| CN | 102595251 A | * | 7/2016 | ......... H04N 21/6437 |
| WO | 02/15434 A1 | | 2/2002 | |

OTHER PUBLICATIONS

Mazurczyk et al., Information-Hiding-Using-Improper-Frame-Padding, researchgate (Year: 2010).*
Office Action of corresponding Chinese Patent Application No. 201710691394.3—21 pages (May 21, 2020).
Extended European Search Report of corresponding European Patent Application No. 18846893.8—11 pages (May 29, 2020).
Schulzrinne et al., "RTP: A Transport Protocol for Real-Time Applications", RFC 3550, Internet Engineering Task Force (IETF)—105 pages (Jul. 2003).
Rey et al., "RTP Retransmission Payload Format", RFC 4588, Internet Engineering Task Force (IETF)—35 pages (Jul. 2006).
International Search Report and Written Opinion; PCT/CN2018/100506; dated Oct. 30, 2018; 16 pages.
First Office Action in Chinese Application No. 201710691394.3; dated Nov. 28, 2019; 21 pages.

* cited by examiner

METHOD, DEVICE AND SYSTEM FOR TRANSMITTING DATA

CROSS-REFERENCE TO RELATED APPLICATIONS

This application is a U.S. national stage application of International Patent Application No. PCT/CN2018/100506 filed on Aug. 14, 2018, which claims priority to Chinese patent application No. 201710691394.3 filed on Aug. 14, 2017, the entire contents of each of which are incorporated herein by reference

TECHNICAL FIELD

Embodiments of the present disclosure relate to a method, device and system of transmitting data.

BACKGROUND

In the technical field of communications, data can be transmitted between a transmitting end and a receiving end under the Real-time Transport Protocol (RTP). Exemplarily, the transmitting end can establish an RTP datalink with the receiving end, and transmits RTP data packets to the receiving end over the RTP data link. It should be noted that each RTP data link only allows transmission of one type of RTP data packets. An effective payload type (PT) flag in this type of RTP data packets corresponds to the RTP data link.

SUMMARY

Various embodiments of the present disclosure provides a method of transmitting data, comprising:

transmitting a plurality of first Real-time Transport Protocol (RTP) data packets to a receiving end over an RTP data link established with a receiving end;

receiving a retransmission indication message sent by the receiving end, the retransmission indication message being intended to indicate an RTP data packet to be retransmitted among the plurality of first RTP data packets;

encapsulating the RTP data packet to be retransmitted according to the retransmission indication message to obtain a second RTP data packet, wherein the second RTP data packet comprises an RTP padding field intended to indicate that the second RTP data packet is a retransmitted RTP data packet, and a type flag of the second RTP data packet is same as a type flag of the first RTP data packet; and transmitting the second RTP data packet to the receiving end over the RTP data link.

In some embodiments of the present disclosure, encapsulating the RTP data packet to be retransmitted according to the retransmission indication message comprises:

suffixing a padding unit to the RTP data packet to be retransmitted, an RTP padding field in the second RTP data packet comprising the padding unit, the padding unit comprising a retransmission indication byte, the retransmission indication byte being intended to indicate that the second RTP data packet is a retransmitted RTP data packet.

In some embodiments of the present disclosure, the retransmission indication byte at least comprises a retransmission flag and a count flag; wherein the retransmission flag is intended to indicate that the second RTP data packet is the retransmitted RTP data packet; and the count flag is intended to indicate the number of times that the transmitting end transmits the second RTP data packet.

In some embodiments of the present disclosure, the retransmission indication byte further comprises a data flag; wherein the data flag is intended to indicate whether an RTP data field in the second RTP data packet is an RTP data field in the RTP data packet to be retransmitted.

In some embodiments of the present disclosure, the padding unit further comprises a length indication byte, the length indication byte being intended to indicate a length of the RTP padding field in the second RTP data packet.

In some embodiments of the present disclosure, the retransmission indication byte is a penultimate byte in the padding unit, and the length indication byte is a last byte in the padding unit;

the retransmission flag comprises two bits, the count flag comprises three bits, and the data flag comprises one bit; and the retransmission flag, the data flag and the count flag are arranged in sequence in the retransmission indication byte, and the two bits in the retransmission flag are first two bits in the retransmission indication byte.

In some embodiments of the present disclosure, encapsulating the RTP data packet to be retransmitted according to the retransmission indication message comprises:

judging whether the RTP data packet to be retransmitted comprises the RTP padding field;

when the RTP data packet to be retransmitted comprises the RTP padding field, suffixing a padding unit to the RTP data packet to be retransmitted to obtain the second RTP data packet, the padding unit comprising a retransmission indication byte, the retransmission indication byte being intended to indicate that the second RTP data packet is a retransmitted RTP data packet; or when the RTP data packet to be retransmitted does not comprise the RTP padding field, suffixing a padding unit to the RTP data packet to be retransmitted, and updating a padding flag in an RTP header field in the RTP data packet to be retransmitted to obtain the second RTP data packet, wherein the updated padding flag is intended to indicate that the second RTP data packet comprises the RTP padding field.

In some embodiments of the present disclosure, before suffixing a padding unit to the RTP data packet to be retransmitted, encapsulating the RTP data packet to be retransmitted according to the retransmission indication message further comprises:

acquiring a predetermined bytes per unit, a total bytes of the RTP data packet to be retransmitted being an integer multiple of the bytes per unit, and the bytes per unit being an $n^{th}$ power of 2, n being an integer greater than or equal to 1; and determining, according to the bytes per unit, the padding unit constituted by m bytes, m being an integer multiple of the bytes per unit.

Various embodiments of the present disclosure provide a method of transmitting data, applicable to a receiving end, comprising:

receiving an Real-time Transport Protocol (RTP)data packet sent by a transmitting end over an RTP data link established with a transmitting end; and determining, according to an RTP padding field in the RTP data packet, whether the RTP data packet is a retransmitted RTP data packet when the RTP data packet comprises the RTP padding field.

In some embodiments of the present disclosure, determining, according to the RTP padding field in the RTP data packet, whether the RTP data packet is the retransmitted RTP data packet comprises:

acquiring a retransmission indication byte in the RTP padding field; and determining, according to the retransmission indication byte, whether the RTP data packet is the retransmitted RTP data packet.

In some embodiments of the present disclosure, the retransmission indication byte at least comprises a retransmission flag and a count flag, the count flag being intended to indicate the number of times that the transmitting end transmits the RTP data packet; and determining, according to the retransmission indication byte, whether the RTP data packet is the retransmitted RTP data packet comprises:

determining, according to the retransmission flag in the retransmission indication byte, whether the RTP data packet is the retransmitted RTP data packet.

In some embodiments of the present disclosure, the retransmission indication byte further comprises a data flag; and the method further comprises:

when the retransmission flag is intended to indicate that the RTP data packet is the retransmitted RTP data packet, acquiring the data flag in the retransmission indication byte;

when the data flag is intended to indicate that an RTP data field in the RTP data packet is an RTP data field in the RTP data packet to be retransmitted, acquiring and storing the RTP data field in the RTP data packet; or when the data flag is intended to indicate that an RTP data field in the RTP data packet is not an RTP data field in the RTP data packet to be retransmitted, deleting the RTP data packet.

In some embodiments of the present disclosure, after receiving the RTP data packet from the receiving end over the RTP data link established with the transmitting end, the method further comprises:

acquiring a length indication byte in the RTP padding field;

determining a length of the RTP padding field according to the length indication byte;

acquiring a predetermined length of an RTP header field in the RTP data packet; and determining the RTP data field in the RTP data packet according to the length of the RTP padding field and the predetermined length of the RTP header field in the RTP data packet.

In some embodiments of the present disclosure, the retransmission indication byte is a penultimate byte in an padding unit, and the length indication byte is a last byte in the padding unit;

the retransmission flag comprises two bits, and the count flag comprises three bits, and the data flag comprises one bit; and the retransmission flag, the data flag and the count flag are arranged in sequence in the retransmission indication field, and the two bits in the retransmission flag are first two bits in the retransmission indication byte.

In some embodiments of the present disclosure, prior to determining, according to the RTP padding field in the RTP data packet, whether the RTP data packet is the retransmitted RTP data packet, the method further comprises:

acquiring a padding flag in an RTP header field in the RTP data packet; and determining, according to the padding flag, whether the RTP data packet comprises the RTP padding field.

Optionally, prior to determining, according to the RTP padding field in the RTP data packet, whether the RTP data packet is the retransmitted RTP data packet, the method further comprises:

acquiring a predetermined bytes per unit;

partitioning the RTP data packet into a plurality of data segments according to the bytes per unit, a total bytes of each of the data segments being equal to the bytes per unit; and parsing the plurality of data segments respectively.

Various embodiments of the present disclosure provide a computer device, comprising a processor and a memory;

Wherein the memory is configured to store a computer program; and the processor is configured to execute the program stored on the memory to perform the method as defined in any one of claims 1 to 8 or perform the method as defined in any one of claims 9 to 16.

Various embodiments of the present disclosure provide a computer-readable storage medium is provided, storing at least one code instruction; wherein the at least one code instruction is executed by a processor to perform the method as provided by the first aspect or perform the method as provided by the second aspect.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

In the technical field of communications, a transmitting end and a receiving end can transmit data under a RTP (for example, the RTP with version number RFC3550). Exemplarily, the transmitting end can establish an RTP data link with the receiving end, and transmit an RTP frame constituted by at least one RTP data packet to the receiving end over the RTP data link. Optionally, both the transmitting end and the receiving end can be a device having a data transmission function, for example, a terminal, a server, or a server cluster constituted by a plurality of servers, which is not limited in the embodiments of the present disclosure.

In the related art, upon receiving the RTP data packets transmitted by the transmitting end over the RTP data link, the receiving end can determine an RTP data packet to be retransmitted among a plurality of RTP data packets (that is, lost RTP data packets among the plurality of RTP data packets), and transmit a retransmission indication message to the receiving end, wherein the retransmission indication message is intended to indicate the RTP data packet to be retransmitted. Upon receiving the retransmission indication message, the transmitting end can modify the PT flag in the RTP data packet to be retransmitted to obtain a new RTP data packet. The transmitting end further needs to establish a data link corresponding to the modified PT flag with the receiving end, and transmit the new RTP data packet to the receiving end over the RTP data link.

In the related art, upon receiving the retransmission indication message, the transmitting end is required to reestablish an RTP data link again, and a process for establishing the RTP data link is complex. Therefore, retransmission of the data packet is complicated, and the efficiency of data transmission is low.

Figure 1:
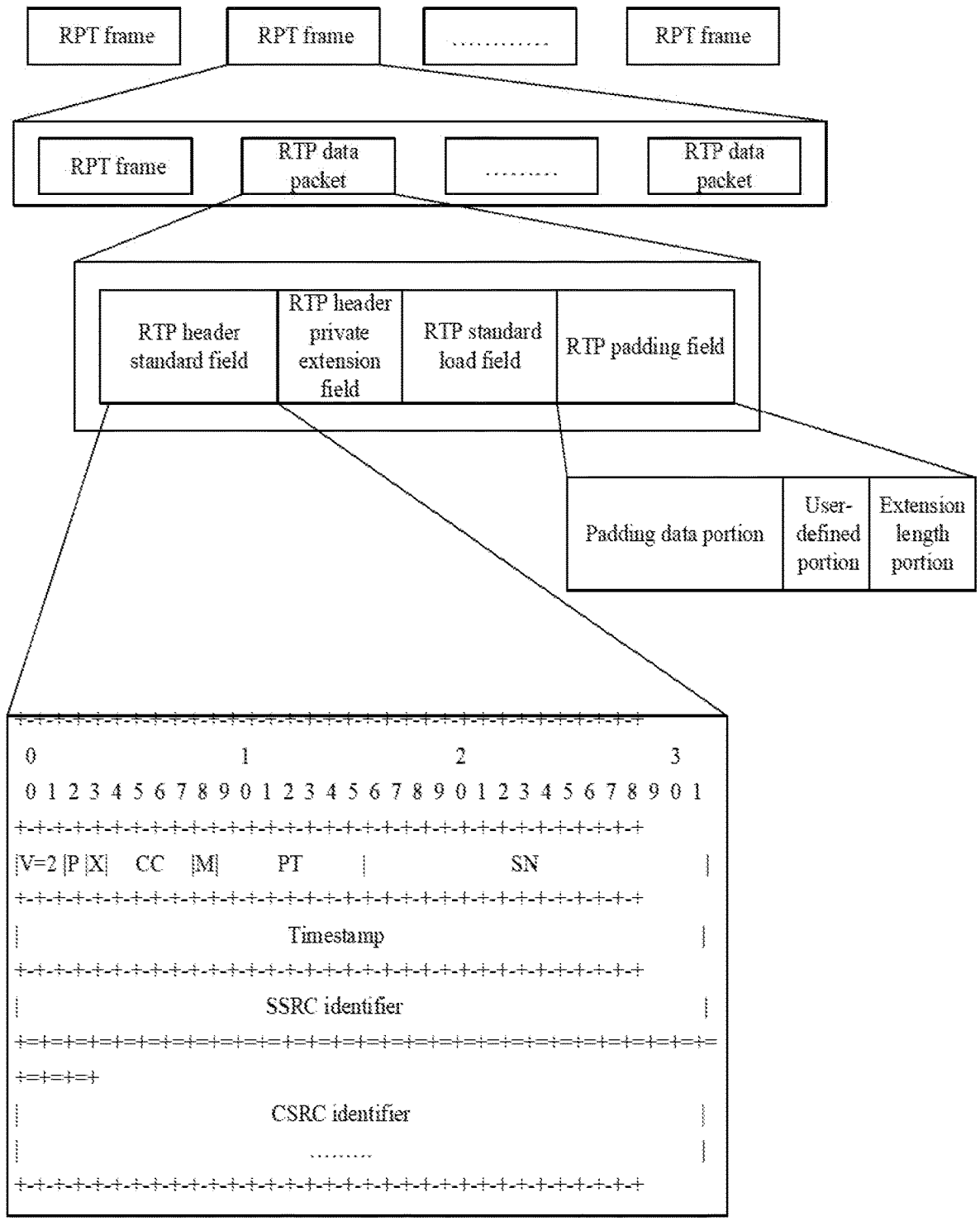
FIG. 1 is a schematic structural diagram of an RTP frame according to an embodiment of the present disclosure.

FIG. 1 is a schematic structural diagram of an RTP frame according to an embodiment of the present disclosure. As illustrated in FIG. 1, one RTP frame comprises at least one RTP data packet, and FIG. 1 uses a case where one RTP frame comprises a plurality of RTP data packet as an example. Each RTP data packet may comprise an RTP header standard field (hereinafter referred to as an RTP header field), an RTP data field (not illustrated in FIG. 1), and an RTP padding field. The RTP data field may comprise an RTP standard load field, and the RTP data packet may further comprise an RTP header private extension field located between the RTP header field and the RTP data field. It should be noted that some RTP data packets in the RTP frame may comprise the RTP padding field whereas some of the RTP data packet may not comprise the RTP padding field, some RTP data packets may comprise the RTP header private extension field whereas some RTP data packet may not comprise the RTP header private extension field, and some RTP data packets may comprise the RTP data field whereas some RTP data packets may not comprise the RTP data field. In FIG. 1, the case where the RTP data packet comprises the RTP header private extension field, the RTP data field and the RTP padding field is taken as an example.

Further, FIG. 1 further illustrates a syntax format of a RTP header field. As illustrated in FIG. 1, in the syntax format of the RTP header field, "+" denotes a space symbol, and "–" or "=" between every adjacent two symbols "+" denotes 1 bit.

The RTP header field comprises a plurality of bits, wherein V=2 denotes a version flag which occupies 2 bits, and indicates a version of the RTP data packet of V=2.

P denotes a padding flag which occupies one bit and is intended to indicate whether a tail of the RTP data packet where the P is located is provided with an RTP padding field. Exemplarily, if the padding flag P is set to 1, it indicates that an RTP padding field is provided at the tail of the RTP data packet; and if the padding flag P is set to 0, it indicates that no RTP padding field is provided at the tail of the RTP data packet.

X denotes an extension flag which occupies one bit and is intended to indicate whether an extension field (that is, an RTP header private extension field) is present between the RTP header field and the RTP data field in the RTP data packet where X is located. Exemplarily, if the extension flag X is set to 1, it indicates that an extension field is present between the RTP header field and the RTP data field in the RTP data packet; and if the extension flag X is set to 0, it indicates that no extension field is present between the RTP header field and the RTP data field in the RTP data packet.

CC denotes a contributing source field flag which occupies 4 bits and is intended to indicate the contributing source count (CSRC).

M denotes a marker flag which occupies one bit and is intended to indicate whether the RTP data packet where M is located is the last RTP data packet in the RTP frame where the RTP data packet is located. Exemplarily, if the marker flag M is set to 1, it indicates that the RTP data packet is the last RTP data packet in the RTP frame; and if the marker flag M is set to 0, it indicates that the RTP data packet is not the last RTP data packet in the RTP frame.

PT denotes a valid payload type flag, which occupies 7 bits and is intended to indicate the type of the RTP data field in the RTP data packet where the PT is located, and the type of the RTP data packet is the same as the type of the RTP data field in the RTP data packet.

SN denotes a sequence number flag, which occupies 16 bits and is intended to indicate a transmission sequence of the RTP data packet where the SN is located, that is, a sequence of transmitting the RTP data packet by the receiving end to a decoder upon receiving the RTP data packet. In the process of transmitting a plurality of RTP data packets by the transmitting end, the value of the sequence number flag SN of the RTP data packet is typically increased by 1 each time an RTP data packet is transmitted. exemplarily, sequence number flags of three RTP data packets A1, A2 and A3 transmitted by the transmitting end in sequence may be, 0000000000000000, 0000000000000001 and 0000000000000010 in sequence.

A timestamp flag occupies 32 bits and is intended to indicate a sampling instant of the RTP data field in the RTP data packet where the timestamp is located.

The syntax format of the RTP header field further comprises some other bits, for example, a synchronization source (SSRC) identifier, and a CSRC identifier, and the like, which are not described herein any further. In the syntax format of the RTP header field, the number of bits occupied by each of the flags may be adjusted. For example, the sequence number flag SN may further occupy 15 bits, and the valid payload type flag PT may further occupy 6 bits.

Figure 2:
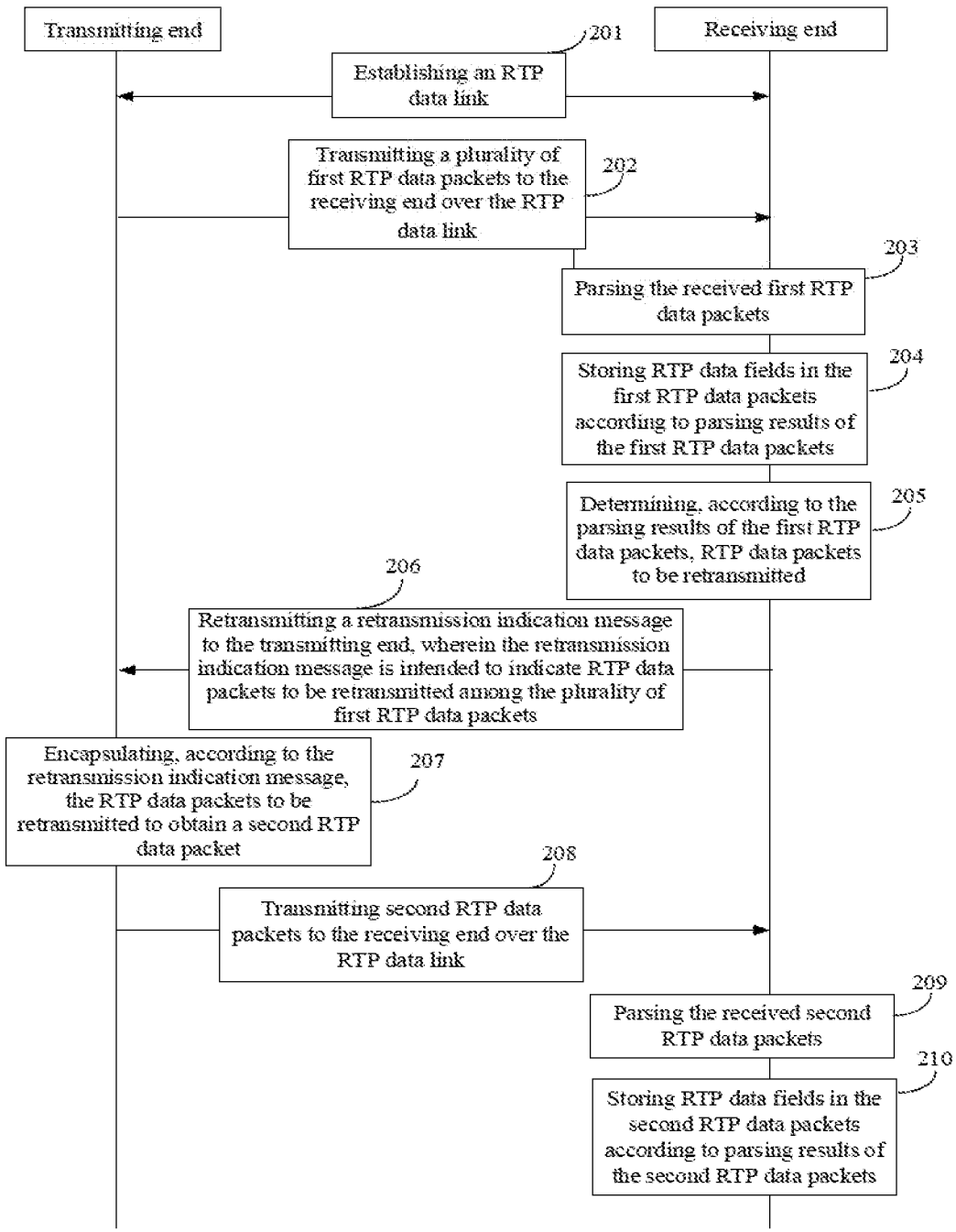
FIG. 2 is a flowchart of a method of transmitting data according to an embodiment of the present disclosure.

FIG. 2 is a flowchart of a method of transmitting data according to an embodiment of the present disclosure. The embodiment of the present disclosure exemplarily describes the process that after the transmitting end initially transmits a plurality of first RTP data packets to the receiving end, the receiving end fails to receive all the first RTP data packets such that the transmitting end needs to retransmit data packets to be retransmitted among the plurality of first RTP data packets. Optionally, it is also possible that the receiving end receives all the first RTP data packets, which is not described in the embodiment of the present disclosure. As illustrated in FIG. 2, the method comprises the following steps:

Step 201: The transmitting end establishes an RTP data link with the receiving end.

In one embodiment of the present disclosure, each RTP data link only allows transmission of a type of RTP data packets. The type indicated by a type flag in such an RTP data packet corresponds to the RTP data link. For example, assuming that an RTP data link only allows transmission of RTP data packet of a media type. The type flag in such a media-type RTP data packet may be a valid payload type flag PT. If the valid payload type flag PT corresponds to bits 0000001, it may be indicated that the RTP data packet is of the media type, and in this case, in each RTP data packet transmitted over the RTP data link, the bits corresponding to the type flag, that is, the valid payload type flag PT, are 0000001.

Step 202: The transmitting end transmits a plurality of first RTP data packets to the receiving end over the RTP data link.

The transmitting end can transmit a plurality of first RTP data packets over the data link established in step 201, wherein the plurality of first RTP data packets are RTP data packets of the same type. Exemplarily, when the RTP data link established in step 201 is for transmitting data packets of the media type, the type flag (the valid payload type flag PT or the SSRC identifier as illustrated in FIG. 1) in each of the plurality of first RTP data packets may be intended to indicate that the first RTP data packets are of the media type.

In step 202, the transmitting end may transmit in sequence the plurality of first RTP data packets to the receiving end, and the transmission sequence of the plurality of first RTP data packets may be reflected by sequence numbers (that is, the values of the sequence number flags) in the first RTP data packets.

Step 203: The receiving end parses the received first RTP data packets.

By parsing the first RTP data packets, the receiving end may acquire each bit in the first RTP data packets, determine content of each bit, and thus determine information indicated by the content of each bit. The receiving end can further determine whether the first RTP data packets are retransmitted RTP data packets according to information indicated by the content of the bits in the first RTP data packets.

Figure 6:
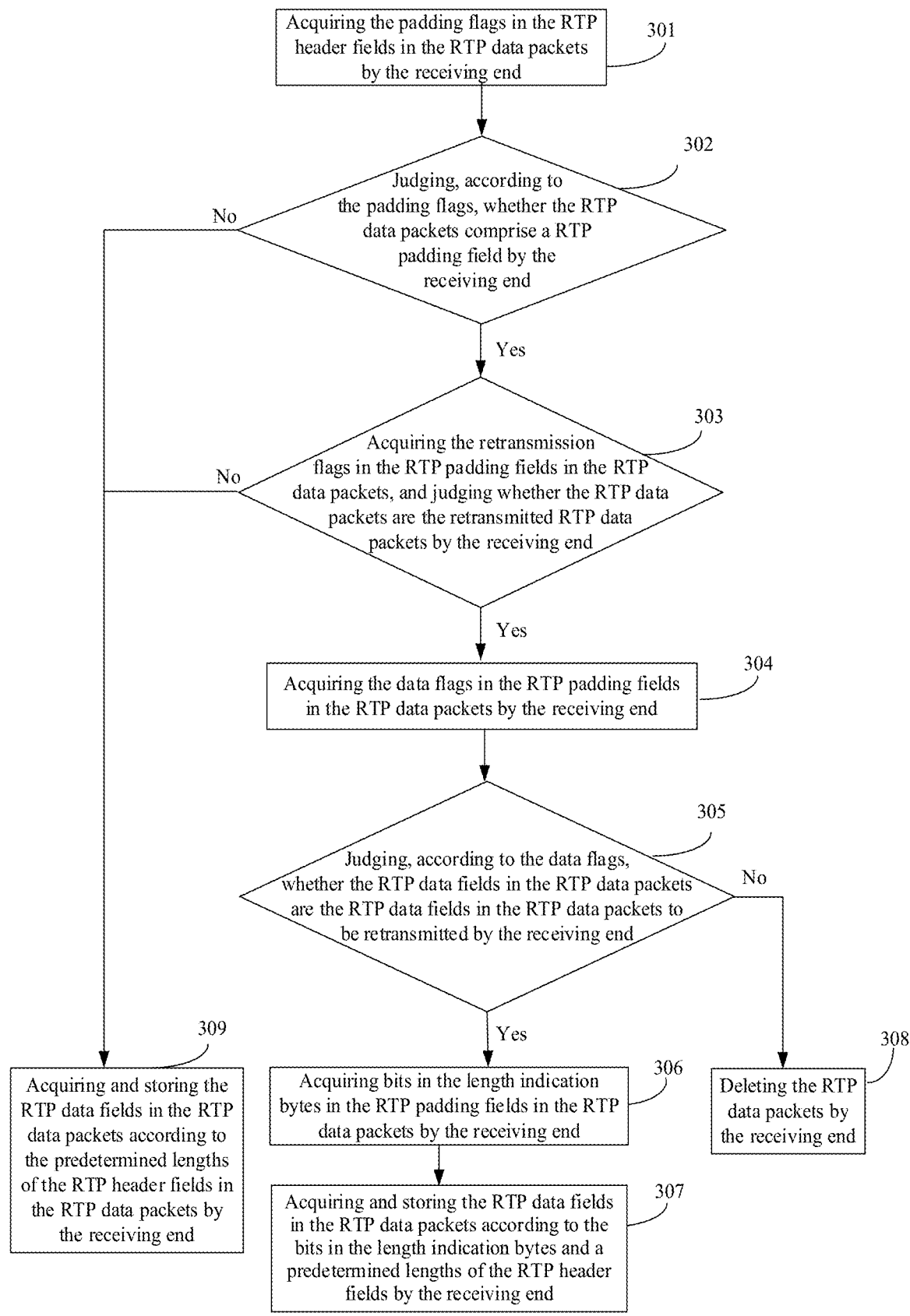
FIG. 6 is a flowchart of a method of parsing a received RTP data packet by a receiving end according to an embodiment of the present disclosure.

It should be noted that step 203 can be implemented by the embodiment corresponding to FIG. 6, which is not described herein any further.

Step 204: The receiving end stores RTP data fields in the first RTP data packets according to parsing results of the first RTP data packets.

In the embodiment of the present disclosure, description is given using the first RTP data packets are RTP data packets initially transmitted by the transmitting end. In this case, in step 203, the parsing results of the first RTP data packets show that the first RTP data packets are not the retransmitted RTP data packets, that is, the first RTP data packets are the RTP data packets that are initially transmitted by the transmitting end. In step 204, the receiving end can directly store the RTP data fields in the first RTP data packets in the format of the data that is initially transmitted.

Step 205: The receiver determines, according to the parsing results of the first RTP data packets, RTP data packets to be retransmitted.

In step S205, the receiving end may determine the RTP data packets to be retransmitted according to the parsing results obtained in step 203. Exemplarily, in step 203, the receiving end can further acquire a sequence number of each of the received first RTP data packets when parsing in sequence the received first RTP data packets. If a difference between a sequence number currently acquired by the receiving end and a previous sequence number acquired by the receiving end is greater than 1, in step 205, the receiving end may determine that the first RTP data packet corresponding to the sequence number between these two sequence numbers is lost.

In some embodiments of the present disclosure, in step 203, the receiving end can further acquire a marker flag of each of the first RTP data packets when paring the received first RTP data packets, and determine, according to the marker flag whether the current first RTP data packet is the last RTP data packet transmitted by the transmitting end (that is, the last data packet among the plurality of first RTP data packets in step 202). When parting the received last first RTP data packet, if the receiving end determines that the received last RTP data packet is the last first RTP data packet that is transmitted by the transmitting end, the receiving end can determine that no data packet is lost after the received last first RTP data packet that is currently parsed. If the received last RTP data packet is not the last first RTP data packet that is transmitted by the transmitting end, the receiving end can determine the first RTP data packets following the currently parsed first RTP data packet in the plurality of first RTP data packets that are transmitted by the transmitting end are all lost. In step 205, the receiving end can determine that each lost first RTP data packet as an RTP data packet to be retransmitted.

In some embodiments of the present disclosure, if the transmitting end transmits 5 first RTP data packets to the receiving end, A1, A2, A3, A4 and A5, respectively, wherein the sequence number in A1 is 0 (herein the sequence number is converted to a decimal for exemplary illustration), the sequence number in A2 is 1, the sequence number in A3 is 2, the sequence number in A4 is 3, and the sequence number in A5 is 4. In addition, the marker flag in A5 is intended to indicate that A5 is the last first RTP data packet transmitted by the transmitting end. If the receiving end receives in sequence A1, A2 and A4, by parsing A1, A2 and A4, the receiving end can determine that the difference (i.e., 2) between the sequence number (3) in A4 and the sequence number (1) in A2 is greater than 1, and the receiving end can determine that A3 corresponding to the sequence number 2 is lost. In addition, A4 is the last first RTP data packet received by the receiving end, after parsing A4, and the receiving end determines that A4 is not the last first RTP data packet transmitted by the transmitting end. In this case, the receiving end can determine the first RTP data packets following A4 among the plurality of RTP data packet transmitted by the transmitting end are all lost Therefore, the receiving end can determine that the RTP data packets to be retransmitted comprise A3 and each of the first RTP data packet (that is, A5) transmitted by the transmitter after A4.

Step 206: The receiving end retransmits a retransmission indication message to the transmitting end, wherein the retransmission indication message is intended to indicate RTP data packets to be retransmitted among the plurality of first RTP data packets.

In some embodiments of the present disclosure, the receiving end can transmit the retransmission indication message to the transmitting end to indicate that among the plurality of first RTP data packets A1, A2, A3, A4 and A5, packets A3 and A5 are the RTP data packets to be retransmitted.

Step 207: The transmitting end encapsulates, according to the retransmission indication message, the RTP data packets to be retransmitted to obtain a second RTP data packet.

In some embodiments of the present disclosure, the second RTP data packet can comprise an RTP padding field indicating that the second RTP data packet is a retransmitted RTP data packet, and a type flag in the second RTP data packet is the same as a type flag in the first RTP data packet Exemplarily, the type flag can be a valid payload type flag PT or an SSRC identifier.

Figure 3:
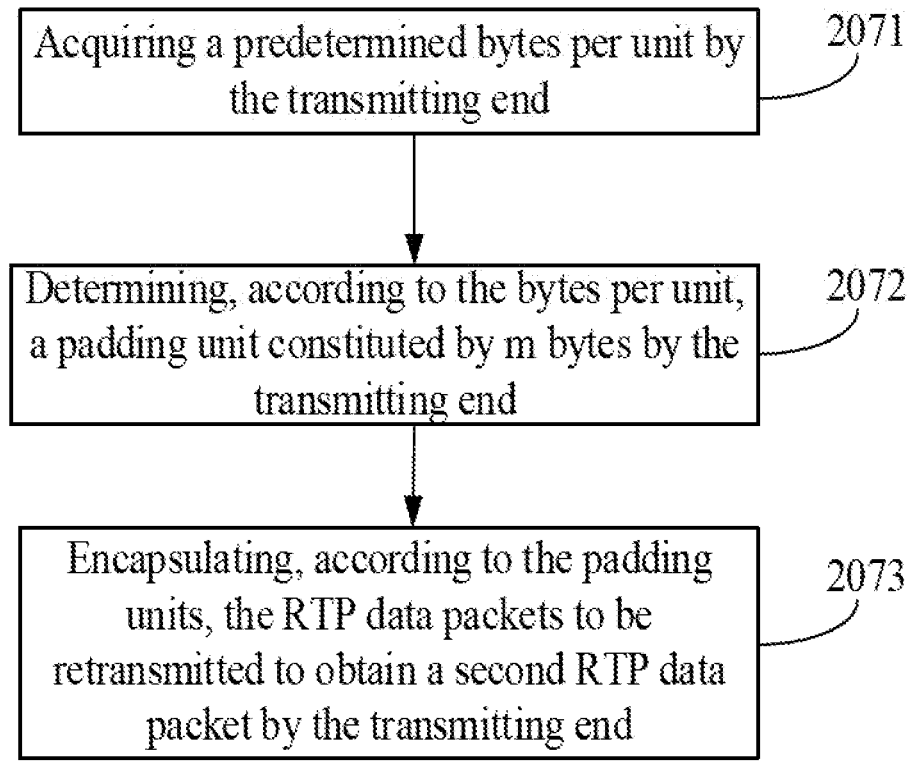
FIG. 3 is a flowchart of a method of obtaining a second RTP data packet by a transmitting end according to an embodiment of the present disclosure.

As illustrated in FIG. 3, step 207 may comprise the following steps:

Step 2071: The transmitting end acquires a predetermined bytes per unit.

In some embodiments of the present disclosure, in order to ensure that the receiving end conveniently processes the RTP data packets upon receiving the RTP data packets, the transmitting end can set the total bytes of the transmitted RTP data packets as an integer multiple of the bytes per unit, and the bytes per unit is an $n^{th}$ power of 2, n being an integer greater than or equal to 1. Therefore, in the embodiment of the present disclosure, the total bytes of an RTP data packet to be transmitted may further be set as an integer multiple of the bytes per unit.

In some embodiments of the present disclosure, the bytes per unit may be 4, and the total bytes of the RTP data packet to be retransmitted may be 100. The embodiment of the present disclosure is described by taking the bytes per unit as 4 as an example. In some embodiments of the present disclosure, the bytes per unit may further be 2, or 8 or the like, which is not limited in the embodiment of the present disclosure.

Step 2072: The transmitting end determines, according to the bytes per unit, a padding unit constituted by m bytes.

m is an integer multiple of the bytes per unit. For example, the padding unit may be constituted by four bytes, that is, m=4.

Step 2073: The transmitting end encapsulates, according to the padding units, the RTP data packets to be retransmitted to obtain a second RTP data packet.

In some embodiments of the present disclosure, when encapsulating, according to the padding units, the RTP data packets to be retransmitted, the transmitting end can first acquire padding flags in the RTP data packets to be retransmitted, and then determine, according to the padding flags, whether the RTP data packets to be retransmitted comprise padding fields.

If the RTP data packet to be retransmitted comprises a padding field, the transmitting end can directly suffix the padding unit to the RTP data packet to be retransmitted to obtain a second RTP data packet, wherein the padding flag (the same as the padding flag in the RTP header field in the RTP data packet to be retransmitted) in RTP header field in the second RTP data packet is intended to indicate that the second RTP data packet comprises a RTP padding field.

If the RTP data packet to be retransmitted does not comprise the RTP padding field, the transmitting end can suffix a padding unit to the RTP data packet to be retransmitted, and update the padding flag in the RTP header field in the RTP data packet to be retransmitted to obtain a second RTP data packet. In this way, the updated padding flag (different from the padding flag in the RTP header field in the RTP data packet to be retransmitted) is intended to indicate that the second RTP data packet comprises the RTP padding field.

For example, if a padding flag is 0, the padding flag is intended to indicate that the corresponding RTP data packet does not comprise an RTP padding field; and if a padding flag is 1, the padding flag is intended to indicate that the corresponding RTP data packet comprises an RTP padding field.

If the padding flag in the RTP header field in an RTP data packet to be retransmitted is 1, in step 2073, the transmitting end can suffix a padding unit to the RTP data packet to be retransmitted to obtain a second RTP data packet. In this way, the padding flag (that is, 1) in the RTP header field in the second RTP data packet is intended to indicate that the second RTP data packet comprises an RTP padding field. In this case, the RTP padding field in the second RTP data packet comprises the RTP padding field and the padding unit in the RTP data packet to be retransmitted. If the padding flag in the RTP header field in an RTP data packet to be retransmitted is 1, in step 2073, the transmitting end can suffix a padding unit to the RTP data packet to be retransmitted, and update the padding flag in the RTP data packet to be retransmitted from 0 to 1, such that a second RTP data packet is obtained. In this way, the padding flag (that is, 1) in the RTP header field in the second RTP data packet is intended to indicate that the second RTP data packet comprises an RTP padding field. In this case, the RTP padding field in the second RTP data packet comprises a padding unit.

In some embodiments of the present disclosure, the padding unit can comprise a retransmission indication byte and a length indication byte. In each RTP data packet, the retransmission indication byte may be intended to indicate whether the RTP data packet is a retransmitted RTP data packet. Since the RTP data packet to be retransmitted is encapsulated in step 2073, in the padding unit added in the encapsulation process, the retransmission indication byte is intended to indicate that the second RTP data packet obtained by encapsulation is a retransmitted RTP data packet, and the retransmission indication byte may be a penultimate byte in the padding unit. The length indication byte is intended to indicate a length of the RTP padding field in the second RTP data packet, and the length indication byte may be a last byte in the padding unit.

The retransmission indication byte may comprise a retransmission flag, a data flag and a count flag that are arranged in sequence in the retransmission indication byte. In each RTP data packet, the retransmission flag in the retransmission indication byte may be intended to indicate whether the RTP data packet is a retransmitted RTP data packet. Since the RTP data packet to be retransmitted is encapsulated in step 2073, in the padding unit added in the encapsulation process, the retransmission flag is intended to indicate that the second RTP data packet obtained by encapsulation is a retransmitted RTP data packet, and the retransmission flag may comprise two bits, wherein these two bits may be the first two bits in the retransmission indication byte. The data flag in the retransmission indication byte is intended to indicate whether an RTP data field in the second RTP data packet is an RTP data field in the RTP data to be retransmitted, and the data flag may comprise 1 bit. The count flag in the retransmission indication byte is intended to indicate the quantity of times that the transmitting end transmits the second RTP data packet, and the count flag may comprise 3 bits. In addition to the retransmission indication byte and the length indication byte, the padding unit may not comprise other bytes, or may comprise other bytes. If the padding unit further comprises other bytes other than the retransmission indication byte and the length indication byte, each bit in the other bytes may be 1.

Prior to step 207, if the transmitting end has not deleted the RTP data packet to be retransmitted, the data flag in the padding unit determined by the transmitting end is intended to indicate that the RTP data field in the RTP data packet is the same as the RTP data field in the RTP data packet to be retransmitted. Prior to step 207, if the transmitting end has deleted the RTP data packet to be retransmitted, after step 206, the transmitting end may randomly select an RTP data packet as an alternative data packet, and perform step 207 on the alternative data packet, that is, encapsulating the alternative packet to obtain a second RTP data packet. In this case, the data flag in the padding unit determined by the transmitting end can be intended to indicate that the RTP data field in the RTP data packet is different from the RTP data field in the RTP data packet to be retransmitted.

Upon transmitting a retransmission instruction to the transmitting end, the receiving end may detect, at regular time intervals, whether the second RTP data packet transmitted by the transmitting end is received. If the receiving end fails to detect the second RTP data packet transmitted by the transmitting end when the predetermined time period expires, the receiving end will re-transmit a retransmission instruction to the transmitting end to instruct the transmitting end to retransmit the second RTP data packet. In this way, it can be ensured that the receiving end receives the retransmitted RTP data packet. Correspondingly, in the padding unit, the count flag N is intended to indicate the number of times that the transmitting end transmits the second RTP data packet, and a count of bits occupied by the count flag N is intended to limit a maximum transmission count (that is, the maximum number of times that the transmitting end transmits the same second RTP data packet to the receiving end). That is, in the embodiment of the present disclosure, the maximum number of times that the transmitter transmits the second RTP data packet to the receiving end is limited. As such, the transmitting end is prevented from transmitting the second RTP data packet for multiple times to the receiving end where the receiving end encounters a fault and thus fails to receive the second RTP data packet, such that waste of resources is reduced.

Figure 4:
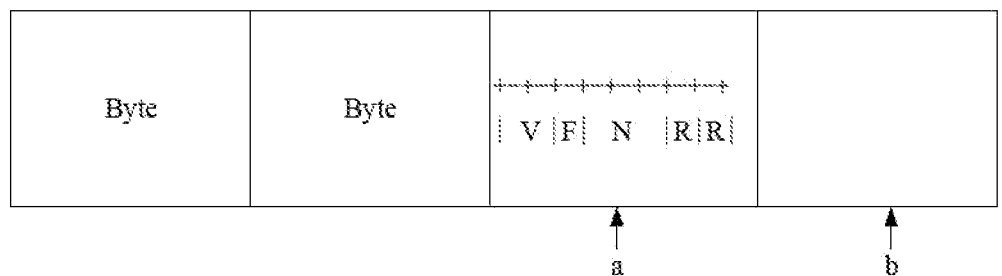
FIG. 4 is a schematic structural diagram of a padding unit according to an embodiment of the present disclosure.

In some embodiments of the present disclosure, FIG. 4 is a schematic structural diagram of a padding unit 40. As illustrated in FIG. 4, the padding unit 40 can be constituted by 4 bytes. These 4 bytes may comprise a retransmission indication byte a and a length indication byte b. The retransmission indication byte a is a penultimate byte in the padding unit 40, and the length indication byte is a last byte in the padding unit 40. The retransmission indication byte a can comprise a retransmission flag V, a data flag F, a count flag N and a reserved flag R. The retransmission flag V, the data flag F, the count flag N and the reserved bit R are arranged in sequence in the retransmission indication byte. The value of the reserved bit R may be set according to the actual needs, and if the reserved bit R has no predefined designated meaning, the value of the reserved bit R can be set to a predetermined value, for example, 1 or 0. It should be noted that the symbol "-" between each two adjacent symbols "+" represents one bit in FIG. 4. The retransmission flag V occupies two bits, the data flag F occupies one bit, the count flag N occupies three bits, and the reserved bit R occupies two bits.

For example, if the retransmission flag V is 01, it indicates that the second RTP data packet is a retransmitted RTP data packet; and if the retransmission flag V is 00, 10 or 11, it indicates that the second RTP data packet is not a retransmitted RTP data packet. If the retransmission flag V is 01 and the data flag F is 1, it indicates that the second RTP data packet is a retransmitted RTP data packet requested by the receiving end; and if the retransmission flag V is 01 and the data flag F is 0, it indicates that the second RTP data packet is not a retransmitted RTP data packet requested by the receiving end, and may be a common RTP data packet. The count flag N in FIG. 4 occupies three bits. When the transmitting end transmits the second RTP data packet for a first time, the count flag N is 000; when the transmitting end transmits the second RTP data packet for a second time, the count flag N is 001; and analogously, when the transmitting end transmits the second RTP data packet for an eighth time, the count flag N is 111, which is the last time that the transmitting end transmits the second RTP data packet to the receiving end.

It should be noted that when the transmitting end performs step 2073, if the RTP data packet to be retransmitted does not comprise an RTP padding field, the RTP padding field in the second RTP data packet obtained by the transmitting end only comprises a padding unit; and if the RTP data packet to be retransmitted comprises an RTP padding field, the RTP padding filed in the second RTP data packet obtained by the transmitting end comprises a padding unit and the RTP padding field in the RTP data packet to be retransmitted.

Assuming that the RTP data packet to be retransmitted does not comprise an RTP padding field, that is, the RTP padding field in the second RTP data packet only comprises a padding unit 40 as illustrated in FIG. 4, the padding unit 40 is constituted by four bytes, and in this case, the content of the length indication byte b is 00000100. Still assuming that the RTP data packet to be retransmitted does comprise an RTP padding field, and the RTP padding field in the second RTP data packet is as illustrated in FIG. 1, the RTP padding field may comprise a padding data portion, a user-defined portion and an extension length portion. The padding data portion may be the RTP padding field in the RTP data packet to be retransmitted, and the user-defined portion and the extension length portion may collaboratively constitute a padding unit, the extension length portion may be a length indication byte in the padding unit, and the user-defined portion may be a remaining portion in the padding unit except the length indication byte. For example, if the padding data is constituted by four bytes, and the padding unit is still the padding unit 40 as illustrated in FIG. 4, the content of the length indication byte b is 00001000.

Figure 5:
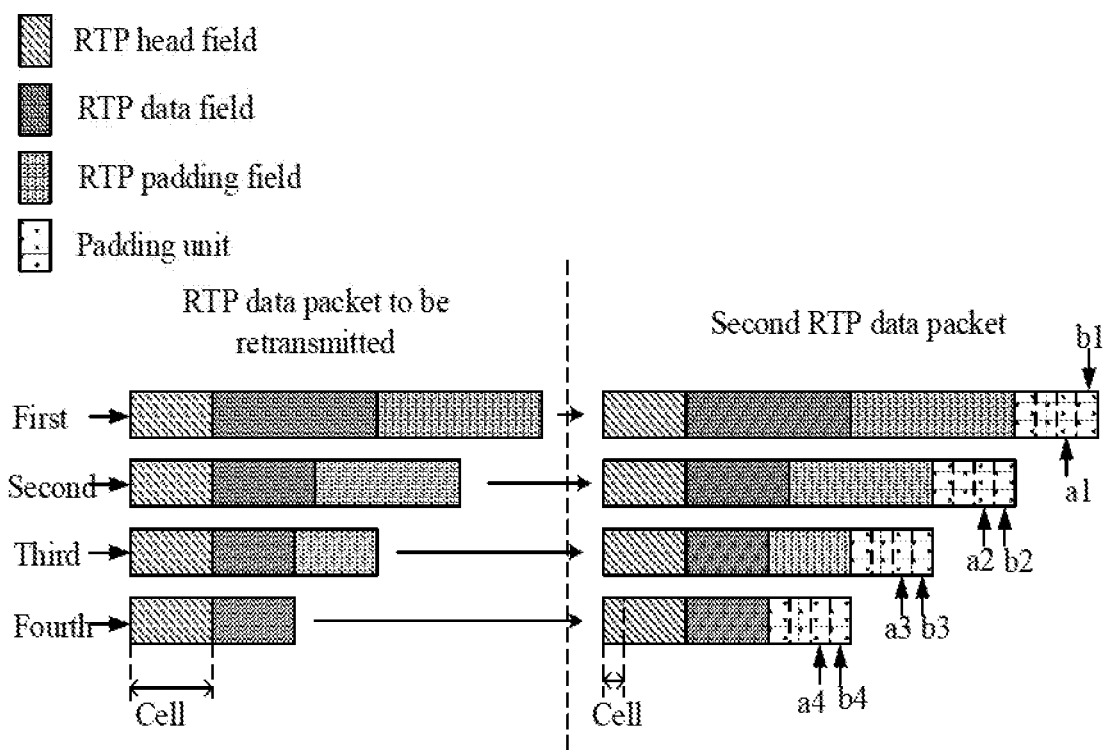
FIG. 5 is a schematic structural diagram of an RTP data packet to be retransmitted and a second RTP data packet according to an embodiment of the present disclosure.

FIG. 5 is a schematic structural diagram of an RTP data packet to be retransmitted and a second RTP data packet according to an embodiment of the present disclosure. Optionally, FIG. 5 illustrates four RTP data packets obtained by encapsulating four different RTP data packets. As illustrated in FIG. 5, in each RTP data packet to be retransmitted, each small cell denotes 4 bytes; and in each second RTP data packet, each cell denotes 1 byte. As illustrated in FIG. 5, a first RTP data packet to be retransmitted comprise an RTP padding field having a length of 8 bytes, a second RTP data packet to be retransmitted comprises an RTP padding field having a length of 7 bytes, a third RTP data packet to be retransmitted comprise an RTP padding field having a length of 4 bytes, and a fourth RTP data packet to be retransmitted comprises no RTP padding field. When encapsulating each RTP data packet to be retransmitted, the transmitting end can suffix a padding unit having a length of 4 bytes to each RTP data packet to be retransmitted, wherein a penultimate byte in the padding unit is a retransmission indication byte, and a last byte is a length indication byte.

In four second RTP data packets as illustrated in FIG. 5, an RTP padding field in a first second RTP data packet may have a length of 12 bytes (8 bytes+4 bytes), and in this case a length indication byte b1 has bits of 00001100; an RTP padding field in a second RTP data packet may have a length of 11 bytes (7 bytes+4 bytes), and in this case a length indication byte b2 has bits of 00000111; an RTP padding field in a third second RTP data packet may have a length of 8 bytes (4 bytes+4 bytes), and in this case a length indication byte b3 has bits of 00001000; and an RTP padding field in a fourth second RTP data packet may have a length of 4 bytes (0 byte+4 bytes), and in this case a length indication byte b4 has bits of 00000100.

Step 208: The transmitting end transmits second RTP data packets to the receiving end over the RTP data link.

The RTP data link herein is the RTP data link established between the transmitting end and the receiving end in step 201. Since the type flag in the second RTP data packet is the same as the type flag in each of the first RTP data packets (comprising the RTP data packets to be retransmitted, the type of the second RTP data packet is the same as the type of the first RTP data packet. Therefore, the transmitting end can transmit the second RTP data packets to the receiving end over the RTP data link established in step 201, with no need to establish a new RTP data link.

Step 209: The receiving end parses the received second RTP data packets.

By parsing the second RTP data packet, the receiving end can acquire each bit in the second RTP data packet, determine content of each bit, and thus determine information indicated by the content of each bit, such that the receiving end determines, according to the information indicated by the content of the bits in the second RTP data packet, whether the second RTP data packet is a retransmitted RTP data packet.

Step 209 can be implemented by the embodiment corresponding to FIG. 6, which is not described herein any further.

Step 210: The receiving end stores RTP data fields in the second RTP data packets according to parsing results of the second RTP data packets.

In the embodiment of the present disclosure, since the second RTP data packet is as the RTP data packet retransmitted by the transmitting end, and the RTP data field in the second RTP data packet is the same as the RTP data field in the RTP data packets for which the transmitting end requests retransmission, in step 209, the parsing result of the second RTP data packet is that the second RTP data packet is a retransmitted RTP data packet, that is, the second RTP data packet is an RTP data packet retransmitted by the transmitting end. In step 210, the receiving end can directly store the RTP data field in the second RTP data packet in a format of retransmission.

In step 204 and step 210, when the receiving end stores the RTP data field in the RTP data packet, the RTP data field is stored in the format of retransmission and in the format of initial transmission respectively. Therefore, the RTP data field in the RTP data packet that is initially transmitted may be effectively distinguished from the RTP data field in the retransmitted RTP data packet. Hence, packet loss ratios (the packet loss ratio is a ratio of the number of packets lost within a unitary time period to the number of packets that shall be theoretically received) may be more conveniently collected. It should be noted that, on one hand, the lost packets may comprise RTP data packets that are successfully retransmitted and RTP data packet that fail to be successfully retransmitted; and on the other hand, the lost packets can only comprise RTP data packets that fail to be successfully retransmitted (without RTP data packets that are successfully retransmitted).

Further, in step 203 and step 209, the receiving end parses the received RTP data packet (for example, in step 203, the receiving end parses the received first RTP data packet, and in step 209, the receiving end parses the received second RTP data packet). Upon parsing the RTP data packet, the receiving end stores the RTP data field in the RTP data packet according to the parsing result (for example, upon step 203, the receiving end stores the RTP data field in the first RTP data packet according to the parsing result of the first RTP data packet; and upon step 209, the receiving end stores the RTP data field in the second RTP data packet according to the parsing result of the second RTP data packet).

In some embodiments of the present disclosure, when parsing the received RTP data packet, the receiving end can first acquire a predetermined bytes per unit, and then partition the received RTP data packet (the first RTP data packet or the second RTP data packet) into a plurality of data segments, wherein each data segment has a total bytes equal to the bytes per unit. Finally, the receiving end can parse the plurality of data segments in the RTP data packet respectively, that is, the receiving end parses each bit in the RTP data packet with the data segment as a unit. For example, the receiving end parses the padding flag, the retransmission flag, the data flag and the count flag in the RTP data packet.

As illustrated in FIG. 6, the receiving end parsing the received RRP data packets, and storing the RTP data fields in the RTP data packets according to the parsing results of the RTP data packets may specifically comprise:

Step 301: The receiving end acquires the padding flags in the RTP header fields in the RTP data packets. Step 302 is performed.

As illustrated in FIG. 1, the receiving end may acquire the third bit (that is, the padding flag) in the RTP header field.

Step 302: The receiving end judges, according to the padding flags, whether the RTP data packets comprise a RTP padding field. If the RTP data packets comprise the RTP padding fields, step 303 is performed; and if the RTP data packets do not comprise the RTP padding fields, step 309 is performed.

In some embodiments of the present disclosure, the padding flag in the RTP header field in the RTP data packet may be intended to indicate whether the RTP data packet comprises an RTP padding field. Therefore, the receiving end may determine, according to the padding flags, whether the RTP data packet comprises the RTP padding field.

Step 303: The receiving end acquires the retransmission flags in the RTP padding fields in the RTP data packets, and judges whether the RTP data packets are the retransmitted RTP data packets. If the RTP data packets are the retransmitted RTP data packets, step 304 is performed. If the RTP data packets are not the retransmitted RTP data packets, step 309 is performed.

Referring to FIG. 4, in step 303, the receiving end may acquire the first two bits (that is, the retransmission flags) in the penultimate byte in the RTP padding field. Exemplarily, if the retransmission flag V is 01, it indicates that the RTP data packet is a retransmitted RTP data packet; and if the retransmission flag V is 00, 10 or 11, it indicates that the RTP data packet is not a retransmitted RTP data packet.

Step 304: The receiving end acquires the data flags in the RTP padding fields in the RTP data packets. Step 305 is performed.

Referring to FIG. 4, the receiving end may acquire the third bits (that is, the data flags) in the penultimate byte in the RTP padding field.

Step 305: The receiving end judges, according to the data flags, whether the RTP data fields in the RTP data packets are the RTP data fields in the RTP data packets to be retransmitted. If the RTP data packets in the RTP data packets are the RTP data fields in the RTP data packets to be retransmitted, step 306 is performed. If the RTP data packets in the RTP data packets are not the RTP data fields in the RTP data packets to be retransmitted, step 308 is performed.

In some embodiments of the present disclosure, still referring to FIG. 4, the receiving end acquires the data flag F in the RTP data packet. If the data flag F is 1, it indicates that the RTP data field in the RTP data packet is the RTP data field in the RTP data packet to be retransmitted. If the data flag F is 0, it indicates that the RTP data field in the RTP data packet is not the RTP data field in the RTP data packet to be retransmitted.

Step 306: The receiving end acquires bits in the length indication bytes in the RTP padding fields in the RTP data packets. Step 307 is performed.

Step 307: The receiving end acquires and stores the RTP data fields in the RTP data packets according to the bits in the length indication bytes and a predetermined lengths of the RTP header fields.

In step 307, the receiving end may first determine the length of the RTP padding field according to the bits in the length indication byte; and then the receiving end may acquire the predetermined length of the RTP header field in the RTP data packet, and determine the bits corresponding to the RTP data field in the RTP data packet according to the length of the RTP padding field and the predetermined length of the RTP header field in the RTP data packet. Finally, the receiving end may acquire the RTP data field according to the bits corresponding to the RTP data field, and store the RTP data field a the format of retransmission.

In some embodiments of the present disclosure, the bits of the length indication byte in an RTP data packet may be 00001000, and the receiving end may determine that the padding field in the RTP data packet has a length of 8 bytes according to the length flag. The receiving end may further acquire the predetermined length of the RTP header field in the RTP data packet, for example, the predetermined length is 9 bytes. In this case, the receiving end may determine that in the RTP data packet, the bits of all the bytes between the ninth byte to the ninth last byte are bits corresponding to the RTP data field, and then the receiver may acquire the RTP data field according to the bits and stores the RTP data field in the format of retransmission.

Step 307 corresponds to step 210 in the embodiment as illustrated in FIG. 2. With respect to the second RTP data packet determined in step 207 in the above embodiment, upon step 304 and step 305, if the receiving end determines that the RTP data field in the second RTP data packet is the RTP data field in the RTP data packet to be retransmitted, the receiving end may directly store the RTP data field in the second RTP data packet in the format of retransmission.

Step 308: The receiving end deletes the RTP data packets.

In step 308, the receiving end may determine, according to a judgment result in step 305, whether to perform the step of deleting the RTP data packets in step 308. Exemplarily, if the receiving end determines in step 305 that the RTP data field in the RTP data packet is not the RTP data field in the RTP data packet to be retransmitted, the receiving end can determine that the received RTP data packet is an alternative data packet transmitted by the transmitting end other than the RTP data packet for which the receiving end requests retransmission. Therefore, the receiving end can directly delete the RTP data packet.

Step 309: The receiving end acquires and stores the RTP data fields in the RTP data packets according to the predetermined lengths of the RTP header fields in the RTP data packets.

In some embodiments of the present disclosure, if it is determined in step 302 that a received RTP data packet comprises no RTP padding field, or it is determined in step 303 that the RTP data packet is not the retransmitted RTP data packet, the receiving end can determine that the RTP data packet is the RTP data packet that is initially transmitted by the transmitting end, and perform the step of acquiring the RTP data field in the RTP data packet in step 309. The receiving end can further perform step 204, that is, can store the RTP data field in the format of initial transmission.

In step 309, the receiving end can first acquire the predetermined length of the RTP header field in the RTP data packet, and then determine the bits corresponding to the RTP data field in the RTP data packet according to the length of the RTP padding field. Finally, the receiving end can acquire the RTP data field in the RTP data packet, and stores the RTP data field in the RTP data packet in a format of initial transmission.

In some embodiments of the present disclosure, if the receiving end determines that the received RTP data packet comprises no RTP padding field, the receiver can determine that the RTP data packet is an RTP data packet that is initialed transmitted by the transmitting end, and the receiving end can acquire a predetermined length of the RTP header field in the RTP data packet, for example, the predetermined length is 9 bytes. The receiving end can determine bits of all the bytes following the ninth byte in the RTP data packet as the bits corresponding to the RTP data field, acquire the RTP data field in the RTP data packet according to the bits, and store the RTP data field in a format of initial transmission.

Step 309 corresponds to step 204 in the embodiment as illustrated in FIG. 2. With respect to the first RTP data packet in the above embodiment, upon step 302 and step 303, if the receiving end can determine that the first RTP data packet is the RTP data packet that is initially transmitted by the transmitting end, the receiving end can directly store the RTP data field in the first RTP data packet in a format of initial transmission.

In step 307 and step 309, when the receiving end stores the RTP data field in the RTP data packet, the RTP data field is stored in a format of retransmission and in a format of initial transmission respectively. Therefore, the RTP data field in the RTP data packet that is initially transmitted can be effectively distinguished from the RTP data field in the retransmitted RTP data packet. Hence, packet loss ratios (the packet loss ratio is a ratio of the number of packets lost within a unit time period to the number of packets that shall be theoretically received) can be more conveniently collected. It should be noted that, on one hand, the lost packets can comprise RTP data packets that are successfully retransmitted and RTP data packet that fail to be successfully retransmitted; and on the other hand, the lost packets may only comprise RTP data packets that fail to be successfully retransmitted (without RTP data packets that are successfully retransmitted).

In summary, in the method of transmitting data according to the embodiment of the present disclosure, in a second RTP data packet obtained after the transmitting end encapsulates an RTP data packet to be retransmitted, the RTP padding field can indicate that the second RTP data packet is a retransmitted RTP data packet, and the type flag in the first RTP data packet is the same as the type flag in the second RTP data packet. Therefore, the second RTP data packet and the first RTP data packet can be transmitted over the same RTP data link, and prior to transmitting the RTP data packet to be retransmitted, the transmitting end does not need to establish an RTP data link with the receiving end. In this way, the steps of data packet retransmission are simplified, and the efficiency of data transmission is improved.

Figure 7:
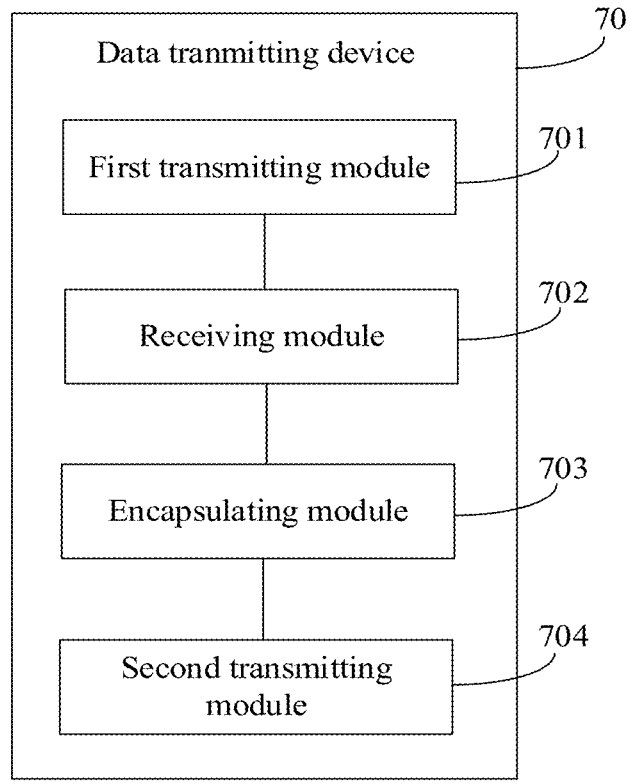
FIG. 7 is a schematic structural diagram of a data transmitting device according to an embodiment of the present disclosure.

FIG. 7 is a schematic structural diagram of a data transmitting device 70 according to an embodiment of the present disclosure. The device is applicable to a transmitting end. As illustrated in FIG. 7, the device 70 comprises:

a first transmitting module 701, configured to transmit a plurality of first RTP data packets to a receiving end over a Real-time Transport Protocol (RTP) data link established with the receiving end;

a receiving module 702, configured to receive a retransmission indication message sent by the receiving end, the retransmission indication message being intended to indicate an RTP data packet to be retransmitted in the plurality of first RTP data packets;

an encapsulating module 703, configured to encapsulate the RTP data packet to be retransmitted according to the retransmission indication message to obtain a second RTP data packet, wherein the second RTP data packet comprises an RTP padding field intended to indicate that the second RTP data packet is a retransmitted RTP data packet, and a type flag in the second RTP data packet is the same as a type flag in the first RTP data packet; and a second transmitting module 704, configured to transmit the second RTP data packet to the receiving end over the RTP data link.

In summary, in the data transmitting device according to the embodiment of the present disclosure, in a second RTP data packet obtained after the encapsulating module encapsulates an RTP data packet to be retransmitted, the RTP padding field can indicate that the second RTP data packet is a retransmitted RTP data packet, and the type flag in the first RTP data packet is the same as the type flag in the second RTP data packet. Therefore, the second RTP data packet and the first RTP data packet can be transmitted over the same RTP data link, and prior to transmitting the RTP data packet to be retransmitted, the transmitting end does not need to establish an RTP data link with the receiving end. In this way, the steps of data packet retransmission are simplified, and the efficiency of data transmission is improved.

In some embodiments of the present disclosure, the encapsulating module is further configured to suffix a padding unit to the RTP data packet to be retransmitted, the RTP padding field in the second RTP data packet comprising the padding unit, the padding unit comprising a retransmission indication byte, the retransmission indication byte being intended to indicate that the second RTP data packet is the retransmitted RTP data packet.

In some embodiments of the present disclosure, the retransmission indication byte at least comprises a retransmission flag and a count flag. The retransmission flag is intended to indicate that the second RTP data packet is the retransmitted RTP data packet; and the count flag is intended to indicate the times that the transmitting end transmits the second RTP data packet.

In some embodiments of the present disclosure, the retransmission indication byte further comprises a data flag. The data flag is intended to indicate whether an RTP data field in the second RTP data packet is an RTP data field in the RTP data packet to be retransmitted.

In some embodiments of the present disclosure, the padding unit further comprises a length indication byte, wherein the length indication byte is intended to indicate a length of the RTP padding field in the second RTP data packet.

In some embodiments of the present disclosure, the retransmission indication byte is a penultimate byte in the padding unit, and the length indication byte is a last byte in the padding unit; the retransmission indication byte comprises two bits, and the count indication byte comprises three bits, and the data indication byte comprises one bit; and the retransmission flag, the data flag and the count flag are arranged in sequence in the retransmission indication field, and the two bits in the retransmission flag are first two bits in the retransmission indication byte.

In some embodiments of the present disclosure, the encapsulating module is further configured to: judge whether the RTP data packet to be retransmitted comprises the RTP padding field; if the RTP data packet to be retransmitted comprises the RTP padding field, suffix a padding unit to the RTP data packet to be retransmitted to obtain a second RTP data packet, the padding unit comprising a retransmission indication byte, the retransmission indication byte being intended to indicate that the second RTP data packet is the retransmitted RTP data packet; or if the RTP data packet to be retransmitted does not comprise a RTP padding field, suffix a padding unit to the RTP data packet to be retransmitted, and update a padding flag in an RTP header field in the RTP data packet to be retransmitted to obtain the second RTP data packet, wherein the updated padding flag is intended to indicate that the second RTP data packet comprises the RTP padding field.

In some embodiments of the present disclosure, the encapsulating module is further configured to: acquire a predetermined bytes per unit, a total bytes of the RTP data packet to be retransmitted being an integer multiple of the bytes per unit, and the bytes per unit being an nth power of 2, n being an integer greater than or equal to 1; and determine, according to the bytes per unit, the padding unit constituted by m bytes, m being an integer multiple of the bytes per unit.

Figure 8:
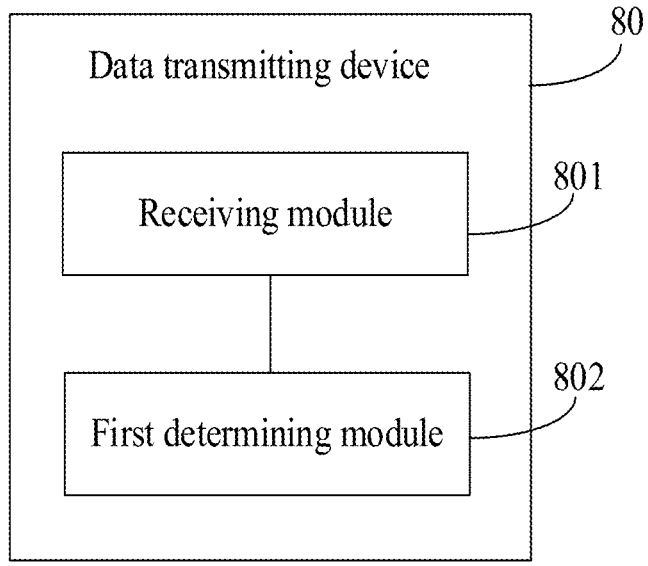
FIG. 8 is a schematic structural diagram of a data transmitting device according to another embodiment of the present disclosure.

FIG. 8 is a schematic structural diagram of another data transmitting device 80 according to an embodiment of the present disclosure. The data transmitting device is applicable to a receiving end. As illustrated in FIG. 8, the data transmitting device 80 comprises:

a receiving module 801, configured to receive an RTP data packet from a transmitting end over a Real-time Transport Protocol (RTP) data link established with the transmitting end; and a first determining module 802, configured to determine whether the RTP data packet is a retransmitted RTP data packet according to the RTP padding field in the RTP data packet when the RTP data packet comprises an RTP padding field.

In summary, in the data transmitting device according to the embodiment of the present disclosure, the first determining module can determine, according to an RTP padding field in an RTP data packet, whether the RTP data packet is a retransmitted RTP data packet. That is, a retransmitted RTP data packet can be identified according to an RTP padding field, with no need to modify a type flag in the retransmitted RTP data packet. Therefore, the receiving end and the transmitting end do not need to reestablish an RTP data link to transmit the RTP data packet to be retransmitted. In this way, the steps of data packet retransmission are simplified, and the efficiency of data transmission is improved.

In some embodiments of the present disclosure, the first determining module can be further configured to: acquire a retransmission indication byte in the RTP padding field; and determine, according to the retransmission indication byte, whether the RTP data packet is the retransmitted RTP data packet.

In some embodiments of the present disclosure, the retransmission indication byte at least comprises a retransmission flag and a count flag, the count flag being intended to indicate the times that the transmitting end sends the RTP data packet.

The first determining module can be further configured to determine, according to the retransmission flag in the retransmission indication byte, whether the RTP data packet is the retransmitted RTP data packet.

In some embodiments of the present disclosure, the retransmission indication byte can further comprise a data flag. As illustrated in FIG. 8, based on FIG. 9, the data transmitting device 80 can further comprise:

a first acquiring module 803, configured to acquire the data flag in the retransmission indication byte when the retransmission flag is intended to indicate that the RTP data packet is the retransmitted RTP data packet;

a second acquiring module 804, configured to acquire and store the RTP data field in the RTP data packet when the data flag is intended to indicate that the RTP data field in the RTP data packet is an RTP data field in the RTP data packet to be retransmitted; or a deleting module 805, configured to delete the RTP data packet if the data flag is intended to indicate that the RTP data field in the RTP data packet is not an RTP data field in the RTP data packet to be retransmitted.

Figure 9:
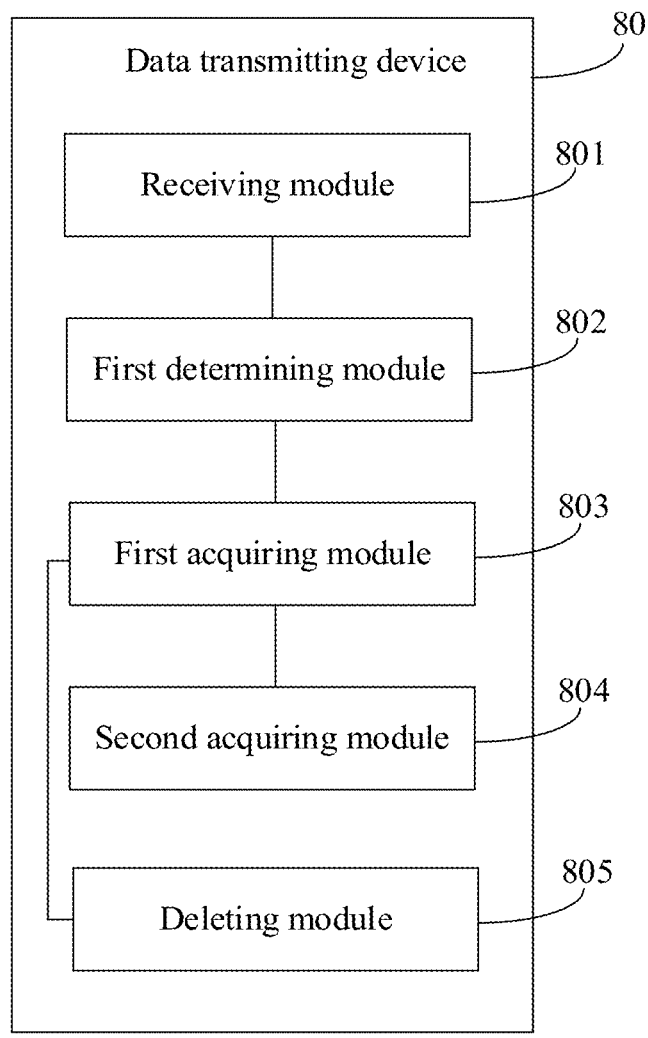
FIG. 9 is a schematic structural diagram of a transmitting data device according to still another embodiment of the present disclosure.
Figure 12:
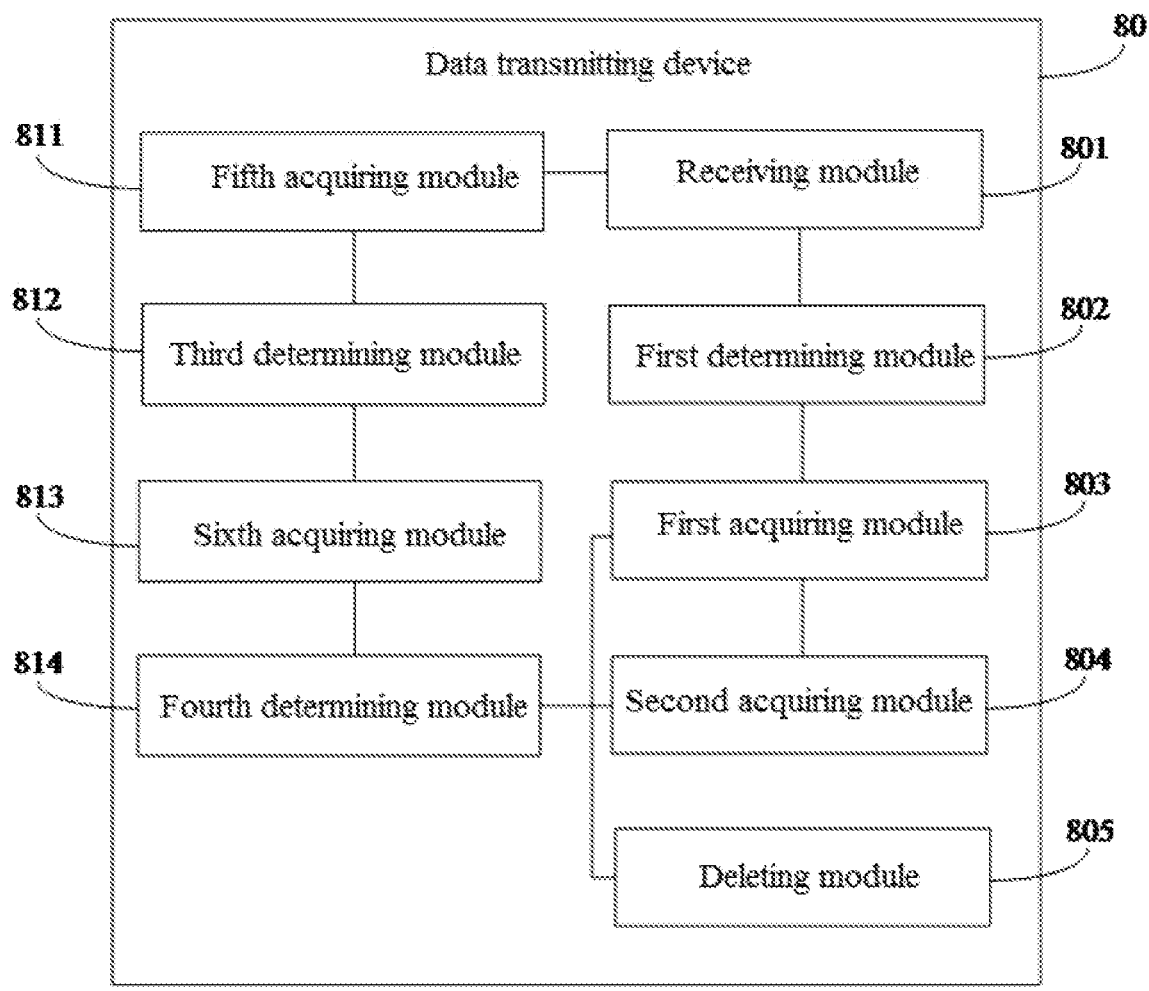
FIG. 12 is a schematic structural diagram of a data transmitting device according to another embodiment of the present disclosure.

In some embodiments of the present disclosure, as illustrated in FIG. 12, based on FIG. 9, the data transmitting device 80 can further comprise:

a fifth acquiring module 811, configured to acquire a length indication byte in the RTP padding field;

a third determining module 812, configured to determine a length of the RTP padding field according to the length indication byte;

a sixth acquiring module 813, configured to acquire a predetermined length of an RTP header field in the RTP data packet; and a fourth determining module 814, configured to determine the RTP data field in the RTP data packet according to the length of the RTP padding field and the predetermined length of the RTP header field in the RTP data packet.

In some embodiments of the present disclosure, the retransmission indication byte can be a penultimate byte in the padding unit, and the length indication byte can be a last byte in the padding unit; the retransmission flag can comprise two bits, and the count flag may comprise three bits, and the data flag may comprise one bit; and the retransmission flag, the data flag and the count flag can be arranged in sequence in the retransmission indication field, and the two bits in the retransmission flag can be first two bits in the retransmission indication byte.

Figure 10:
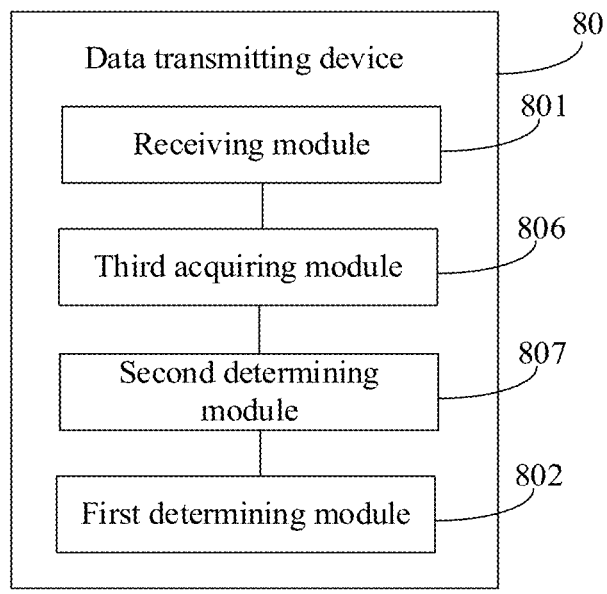
FIG. 10 is a schematic structural diagram of a data transmitting device according to still yet another embodiment of the present disclosure.

In some embodiments of the present disclosure, as illustrated in FIG. 10, based on FIG. 8, the data transmitting device 80 can further comprise:

a third acquiring module 806, configured to acquire a padding flag in an RTP header field in the RTP data packet; and a second determining module 807, configured to determine, according to the padding flag, whether the RTP data packet comprises the RTP padding field.

Figure 11:
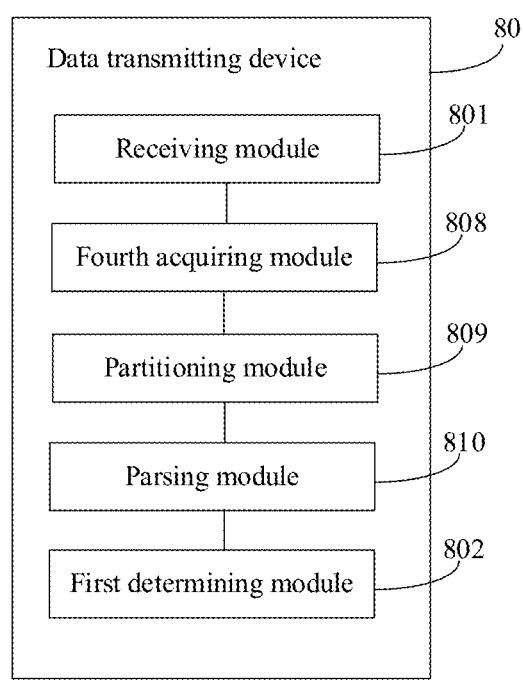
FIG. 11 is a schematic structural diagram of a data transmitting device according to another embodiment of the present disclosure.

In some embodiments of the present disclosure, as illustrated in FIG. 11, based on FIG. 8, the data transmitting device 80 can further comprise:

a fourth acquiring module 808, configured to acquire a predetermined bytes per unit;

a partitioning module 809, configured to partition the RTP data packet into a plurality of data segments according to the bytes per unit, a total bytes of each of the data segments being equal to the bytes per unit; and a parsing module 810, configured to parse the plurality of data segments respectively.

In summary, in the data transmitting device according to the embodiment of the present disclosure, the first determining module may determine, according to an RTP padding field in an RTP data packet, whether the RTP data packet is a retransmitted RTP data packet. That is, a retransmitted RTP data packet can be identified according to an RTP padding field, with no need to modify a type flag in the retransmitted RTP data packet. Therefore, the receiving end and the transmitting end do not need to reestablish an RTP data link to transmit the RTP data packet to be retransmitted. In this way, the steps of data packet retransmission are simplified, and the efficiency of data transmission is improved.

An embodiment of the present disclosure provides a system for transmitting data. The system may comprise a transmitting end and a receiving end.

The transmitting end may comprise the data transmitting device as illustrated in FIG. 7, and the receiving end may comprise the data transmitting device as illustrated in any one of FIG. 8 to FIG. 12.

Figure 13:
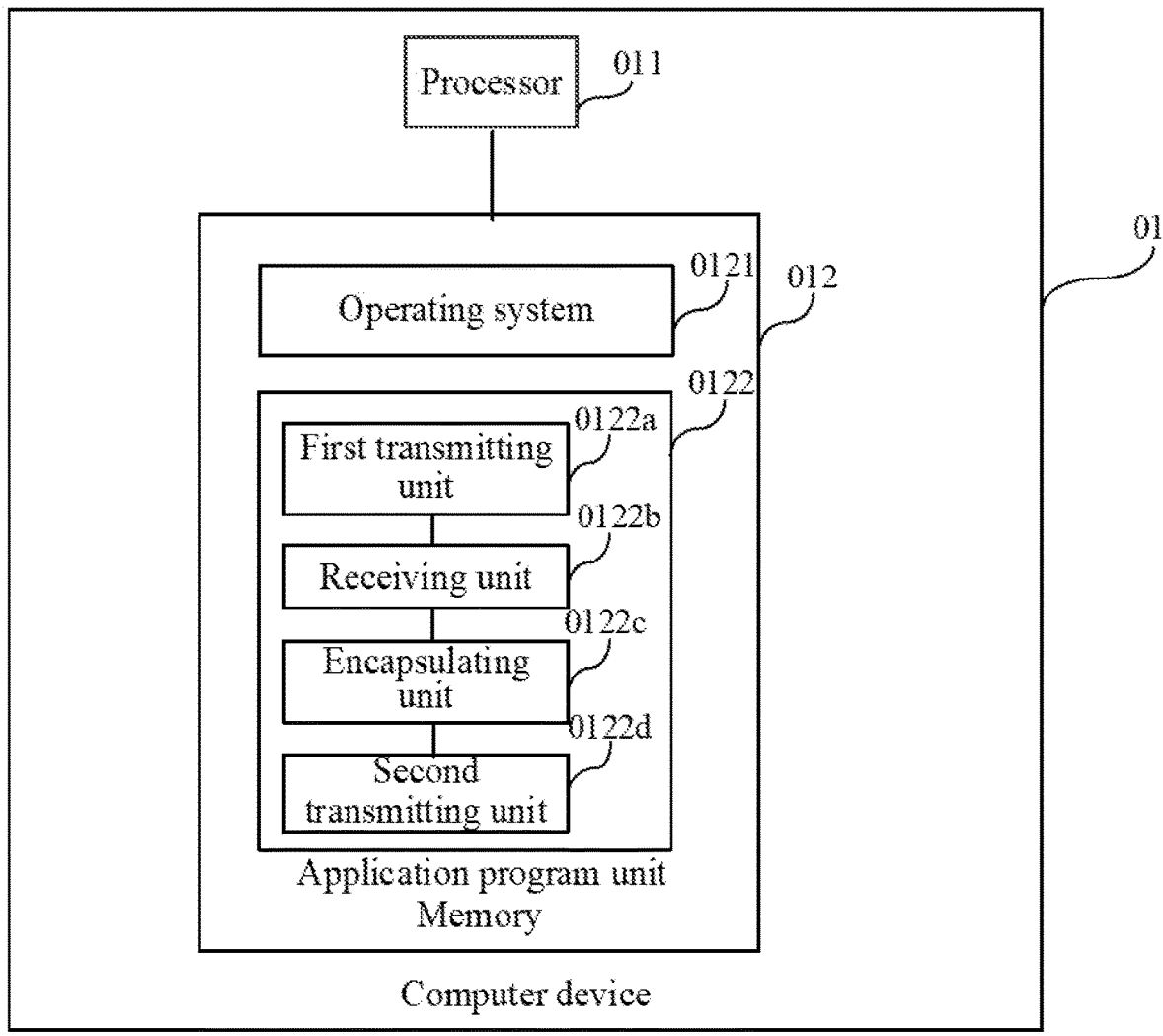
FIG. 13 is a schematic structural diagram of a light strip according to an embodiment of the present disclosure.

FIG. 13 is a schematic structural diagram of a computer device 01 according to an embodiment of the present disclosure. The computer device may be applied to the transmitting end in the system for transmitting data. The computer device 01 may comprise a processor 011 and a memory 012.

The memory 012 is configured to store a computer program.

The processor 011 is configured to perform the program stored on the memory 012 to perform step 201, step 202, step 207, and step 208 in the above method of transmitting data. Exemplarily, the method can comprise:

transmitting a plurality of first RTP data packets to a receiving end over a Real-time Transport Protocol (RTP) data link established with the receiving end;

receiving a retransmission indication message sent by the receiving end, the retransmission indication message being intended to indicate an RTP data packet to be retransmitted among the plurality of first RTP data packets;

encapsulating the RTP data packet to be retransmitted according to the retransmission indication message to obtain a second RTP data packet, wherein the second RTP data packet comprises an RTP padding field intended to indicate that the second RTP data packet is a retransmitted RTP data packet, and a type flag in the second RTP data packet is the same as a type flag in the first RTP data packet; and transmitting the second RTP data packet to the receiving end over the RTP data link.

In some embodiments of the present disclosure, the processor 011 comprises one or a plurality of processing cores. The processor 011 runs the computer program stored on the memory 012 to perform various functional applications and data processing, wherein the computer program comprises software applications and units.

The computer program stored on the memory 012 comprises software applications and units. Optionally, the memory 012 can store an operating system 0121, and an application program unit 0122 required for at least one function. The operating system 0121 can be Real Time eXecutive (RTX), LINUX, UNIX, WINDOWS or OS X or the like operating system. The application program unit 0122 may comprise a first transmitting unit 0122a, a receiving unit 0122b, an encapsulating unit 0122c and a second transmitting unit 0122d.

The first transmitting unit 0222a has the same or similar function as the first transmitting module 701 in the data transmitting device as illustrated in FIG. 7.

The receiving unit 0122b has the same or similar function as the receiving module 702 in the data transmitting device as illustrated in FIG. 7.

The encapsulating unit 0122c has the same or similar function as the encapsulating module 703 in the data transmitting device as illustrated in FIG. 7.

The second transmitting unit 0122d has the same or similar function as the second transmitting module 704 in the data transmitting device as illustrated in FIG. 7.

Figure 14:
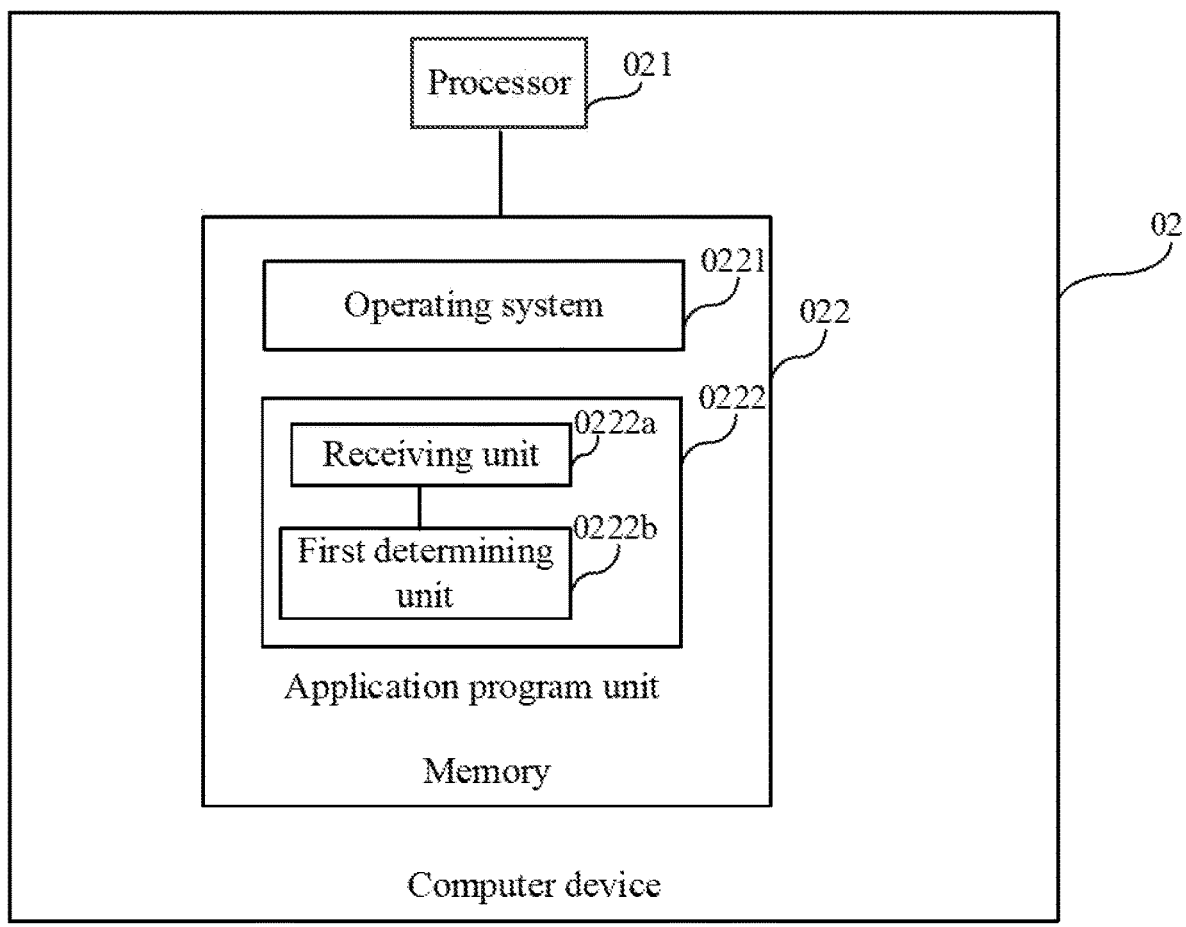
FIG. 14 is a schematic structural diagram of a computer device according to an embodiment of the present disclosure.

FIG. 14 is a schematic structural diagram of a computer device 02 according to another embodiment of the present disclosure. The computer device can be applicable to the receiving end in the system for transmitting data. The computer device 02 may comprise a processor 021 and a memory 022.

The memory 022 is configured to store a computer program.

The processor 021 is configured to perform the program stored on the memory 022 to perform step 201, step 203, step 204, step 205, step 206, step 209 and step 210 in the above method of transmitting data. Exemplarily, the method may comprise:

receiving an RTP data packets from a transmitting end over a Real-time Transport Protocol (RTP) data link established with a transmitting end; and if the RTP data packet comprises an RTP padding field, determining, according to the RTP padding field in the RTP data packet, whether the RTP data packet is a retransmitted RTP data packet.

In some embodiments of the present disclosure, the processor 021 comprises one or a plurality of processing cores. The processor 021 runs the computer program stored on the memory 022 to perform various functional applications and data processing, wherein the computer program comprises software applications and units.

The computer program stored on the memory 022 comprises software applications and units. Optionally, the memory 022 can store an operating system 0221, and an application program unit 0222 desired by at least one function. The operating system 0221 may be RTX, LINUX, UNIX, WINDOWS or OS X or the like operating system. The application program unit 0222 may comprise a receiving unit 0222a and a first determining unit 0222b.

The receiving unit 0222a has the same or similar function as the receiving module 801 in the data transmitting device as illustrated in FIG. 8.

The first determining unit 0222b has the same or similar function as the first determining module 802 in the data transmitting device as illustrated in FIG. 8.

An embodiment of the present disclosure provides a storage medium. The storage medium may be a non-volatile computer-readable storage medium which stores code instructions. The code instructions may be executed by a processor to perform step 201, step 202, step 205, step 207 and step 208 in the above method of transmitting data or perform step 201, step 203, step 204, step 205, step 206, step 209 and step 210 in the above method of transmitting data.

An embodiment of the present disclosure further provides a computer program product comprising instructions. The computer program product, when being run on a computer, may cause the computer to perform step 201, step 202, step 205, step 207 and step 208 in the above method of transmitting data or perform step 201, step 203, step 204, step 205, step 206, step 209 and step 210 in the above method of transmitting data.

An embodiment of the present disclosure further provides a chip. The chip comprises a programmable logic circuit and/or program instructions. When the chip runs, the programmable logic circuit and/or program instructions may be configured to perform step 201, step 202, step 205, step 207 and step 208 in the above method of transmitting data or perform step 201, step 203, step 204, step 205, step 206, step 209 and step 210 in the above method of transmitting data.

It should be noted that, during data transmission by the data transmitting device according to the above embodiments, the data transmitting device are described by only using division of the above functional modules as examples. In practice, the functions may be assigned to different functional modules for implementation as required. To be specific, the internal structure of the data transmitting device is divided into different functional modules to implement all or part of the above-described functions. In addition, the data transmitting device according to the above embodiment is based on the same inventive concept as the method of transmitting data according to the embodiments of the present invention. The specific implementation is elaborated in the method embodiments, which is not be detailed herein any further.

The technical solutions provided by the present disclosure may comprise the following benefits.

The present disclosure provides a method, data transmitting device and system of transmitting data. In the method of transmitting data, in a second RTP data packet obtained after the transmitting end encapsulates an RTP data packet to be retransmitted, an RTP padding field may indicate that the second RTP data packet is a retransmitted RTP data packet, and a type flag in a first RTP data packet is the same as a type flag in the second RTP data packet. Therefore, the second RTP data packet and the first RTP data packet may be transmitted over the same RTP data link, and prior to retransmission of the RTP data packet to be retransmitted, the transmitting end does not need to establish the RTP datalink with the receiving end. In this way, the steps of data packet retransmission are simplified, and the efficiency of data transmission is improved.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A method of transmitting data, applicable to a transmitting end, the method comprising:
   transmitting a plurality of first Real-time Transport Protocol (RTP) data packets to a receiving end over an RTP data link established with the receiving end;
   receiving a retransmission indication message sent by the receiving end, the retransmission indication message being intended to indicate an RTP data packet to be retransmitted among the plurality of first RTP data packets;
   encapsulating the RTP data packet to be retransmitted according to the retransmission indication message to obtain a second RTP data packet, wherein the second RTP data packet comprises an RTP padding field intended to indicate that the second RTP data packet is a retransmitted RTP data packet, and a type flag of the second RTP data packet is same as a type flag of the first RTP data packet; and
   transmitting the second RTP data packet to the receiving end over the RTP data,
   wherein encapsulating the RTP data packet to be retransmitted according to the retransmission indication message comprises:
   suffixing a padding unit to the RTP data packet to be retransmitted, an RTP padding field in the second RTP data packet comprising the padding unit, the padding unit comprising a retransmission indication byte, the retransmission indication byte being intended to indicate that the second RTP data packet is a retransmitted RTP data packet.

2. The method according to claim 1, wherein the retransmission indication byte at least comprises a retransmission flag and a count flag; wherein
   the retransmission flag is intended to indicate that the second RTP data packet is the retransmitted RTP data packet; and
   the count flag is intended to indicate the number of times that the transmitting end transmits the second RTP data packet.

3. The method according to claim 2, wherein the retransmission indication byte further comprises a data flag; wherein
   the data flag is intended to indicate whether an RTP data field in the second RTP data packet is an RTP data field in the RTP data packet to be retransmitted.

4. The method according to claim 3, wherein the padding unit further comprises a length indication byte, the length indication byte being intended to indicate a length of the RTP padding field in the second RTP data packet.

5. The method according to claim 4, wherein
   the retransmission indication byte is a penultimate byte in the padding unit, and the length indication byte is a last byte in the padding unit;
   the retransmission flag comprises two bits, the count flag comprises three bits, and the data flag comprises one bit; and
   the retransmission flag, the data flag and the count flag are arranged in sequence in the retransmission indication byte, and the two bits in the retransmission flag are first two bits in the retransmission indication byte.

6. The method according to claim 1, wherein encapsulating the RTP data packet to be retransmitted according to the retransmission indication message further comprises:
   acquiring a predetermined bytes per unit, a total bytes of the RTP data packet to be retransmitted being an integer multiple of the bytes per unit, and the bytes per unit being an $n^{th}$ power of 2, n being an integer greater than or equal to 1; and
   determining, according to the bytes per unit, the padding unit constituted by m bytes, m being an integer multiple of the bytes per unit.

7. The method according to claim 1, wherein operations of the method are performed by a device comprising a processor and a memory;
   wherein:
   the memory is configured to store a computer program; and
   the processor is configured to execute the computer program stored on the memory to perform the operations.

8. The method according to claim 1, wherein operations of the method are performed by a processor,
   wherein at least one code instruction stored in a non-transitory computer-readable storage medium causes the processor to perform the operations, when the at least one code instruction is executed by the processor.

9. A method of transmitting data, applicable to a transmitting end, the method comprising:
   transmitting a plurality of first Real-time Transport Protocol (RTP) data packets to a receiving end over an RTP data link established with the receiving end;
   receiving a retransmission indication message sent by the receiving end, the retransmission indication message being intended to indicate an RTP data packet to be retransmitted among the plurality of first RTP data packets;
   encapsulating the RTP data packet to be retransmitted according to the retransmission indication message to obtain a second RTP data packet, wherein the second RTP data packet comprises an RTP padding field intended to indicate that the second RTP data packet is a retransmitted RTP data packet, and a type flag of the second RTP data packet is same as a type flag of the first RTP data packet; and
   transmitting the second RTP data packet to the receiving end over the RTP data link,
   wherein encapsulating the RTP data packet to be retransmitted according to the retransmission indication message comprises:
   judging whether the RTP data packet to be retransmitted comprises the RTP padding field;
   when the RTP data packet to be retransmitted comprises the RTP padding field, suffixing a padding unit to the RTP data packet to be retransmitted to obtain the second RTP data packet, the padding unit comprising a retransmission indication byte, the retransmission indication byte being intended to indicate that the second RTP data packet is a retransmitted RTP data packet; or
   when the RTP data packet to be retransmitted does not comprise the RTP padding field, suffixing a padding unit to the RTP data packet to be retransmitted, and updating a padding flag in an RTP header field in the RTP data packet to be retransmitted to obtain the second RTP data packet, wherein the updated padding flag is intended to indicate that the second RTP data packet comprises the RTP padding field.

10. A method of transmitting data, applicable to a receiving end, the method comprising:
    receiving an RTP data packet sent by a transmitting end over a Real-time Transport Protocol (RTP) data link established with the transmitting end; and determining, according to an RTP padding field in the RTP data packet, whether the RTP data packet is a retransmitted RTP data packet, when the RTP data packet comprises the RTP padding field, wherein prior to determining, according to the RTP padding field in the RTP data packet, whether the RTP data packet is the retransmitted RTP data packet, the method further comprises:

acquiring a predetermined bytes per unit;

partitioning the RTP data packet into a plurality of data segments according to the predetermined bytes per unit, a total bytes of each of the data segments being equal to the predetermined bytes per unit; and parsing the plurality of data segments respectively.

11. The method according to claim 10, wherein determining, according to the RTP padding field in the RTP data packet, whether the RTP data packet is the retransmitted RTP data packet comprises:

acquiring a retransmission indication byte in the RTP padding field; and determining, according to the retransmission indication byte, whether the RTP data packet is the retransmitted RTP data packet.

12. The method according to claim 11, wherein the retransmission indication byte at least comprises a retransmission flag and a count flag, the count flag being intended to indicate the number of times that the transmitting end transmits the RTP data packet; and determining, according to the retransmission indication byte, whether the RTP data packet is the retransmitted RTP data packet comprises:

determining, according to the retransmission flag in the retransmission indication byte, whether the RTP data packet is the retransmitted RTP data packet.

13. The method according to claim 12, wherein the retransmission indication byte further comprises a data flag; and the method further comprises:

when the retransmission flag is intended to indicate that the RTP data packet is the retransmitted RTP data packet, acquiring the data flag in the retransmission indication byte;

when the data flag is intended to indicate that an RTP data field in the RTP data packet is an RTP data field in the RTP data packet to be retransmitted, acquiring and storing the RTP data field in the RTP data packet; or when the data flag is intended to indicate that an RTP data field in the RTP data packet is not an RTP data field in the RTP data packet to be retransmitted, deleting the RTP data packet.

14. The method according to claim 13, wherein after receiving the RTP data packets sent by the transmitting end over the RTP data link established with the transmitting end, the method further comprises:

acquiring a length indication byte in the RTP padding field;

determining a length of the RTP padding field according to the length indication byte;

acquiring a predetermined length of an RTP header field in the RTP data packet; and determining the RTP data field in the RTP data packet according to the length of the RTP padding field and the predetermined length of the RTP header field in the RTP data packet.

15. The method according to claim 14, wherein the retransmission indication byte is a penultimate byte in a padding unit, and the length indication byte is a last byte in the padding unit;

the retransmission flag comprises two bits, and the count flag comprises three bits, and the data flag comprises one bit; and the retransmission flag, the data flag and the count flag are arranged in sequence in the retransmission indication field, and the two bits in the retransmission flag are first two bits in the retransmission indication byte.

16. The method according to claim 10, wherein prior to determining, according to the RTP padding field in the RTP data packet, whether the RTP data packet is the retransmitted RTP data packet, the method further comprises:

acquiring a padding flag in an RTP header field in the RTP data packet; and determining, according to the padding flag, whether the RTP data packet comprises the RTP padding field.

17. The method according to claim 10, wherein operations of the method are performed by a device comprising a processor and a memory;

wherein:

the memory is configured to store a computer program; and the processor is configured to execute the computer program stored on the memory to perform the operations.

18. The method according to claim 10, wherein operations of the method are performed by a processor, wherein at least one code instruction stored in a non-transitory computer-readable storage medium causes the processor to perform the operations, when the at least one code instruction is executed by the processor.

* * * * *

UNITED STATES PATENT AND TRADEMARK OFFICE
CERTIFICATE OF CORRECTION

PATENT NO. : 11,196,792 B2
APPLICATION NO. : 16/639533
DATED : December 7, 2021
INVENTOR(S) : Xin It is certified that error appears in the above-identified patent and that said Letters Patent is hereby corrected as shown below:

On the Title Page

In Column 2, item (57), ABSTRACT, Line 1, delete "composing:" and insert --comprising:--.

In Column 2, item (57), ABSTRACT, Line 11, delete "composes" and insert --comprises--.

On Page 2, in Column 1, Line 2, delete "packet" and insert --packet;--.

In the Drawings

On Sheet 1 of 11, in Fig. 1, and on the title page, the illustrative figure, Line 1, the first block, delete "RPT frame" and insert --RTP frame--.

On Sheet 1 of 11, in Fig. 1, and on the title page, the illustrative figure, Line 1, the second block, delete "RPT frame" and insert --RTP frame--.

On Sheet 1 of 11, in Fig. 1, and on the title page, the illustrative figure, Line 1, the fourth block, delete "RPT frame" and insert --RTP frame--.

On Sheet 1 of 11, in Fig. 1, and on the title page, the illustrative figure, Line 2, delete "RPT frame" and insert --RTP frame--.

On Sheet 6 of 11, in Fig. 7, Line 1, delete "Data tranmitting device" and insert --Data transmitting device--.

In the Specification

In Column 1, Line 12, delete "reference" insert --reference.--.

In Column 1, Line 25, delete "datalink" and insert --data link--.

Signed and Sealed this
Tenth Day of May, 2022

Katherine Kelly Vidal
*Director of the United States Patent and Trademark Office*

CERTIFICATE OF CORRECTION (continued)
U.S. Pat. No. 11,196,792 B2

In Column 6, Line 52, delete "exemplarily," and insert --Exemplarily--.

In Column 7, Line 22, delete "media-type" and insert --media type--.

In Column 8, Line 64, delete "lost" and insert --lost.--.

In Column 9, Line 20, delete "packet" and insert --packet.--.

In Column 14, Line 39, delete "RRP" and insert --RTP--.

In Column 15, Line 46, delete "a the" and insert --in the--.

In Column 16, Line 39, delete "initialed" and insert --initially--.

In Column 21, Lines 13 and 14, delete "Real Time eXecutive (RTX)," and insert --Real Time Executive (RTX),--.

In Column 22, Line 59, delete "datalink" and insert --data link--.

In the Claims

In Column 23, Line 22, Claim 1, delete "data," and insert --data link,--.